United States Patent [19]

Akimaru et al.

[11] 3,775,566

[45] Nov. 27, 1973

[54] STORED PROGRAM CONTROLLED ELECTRONIC COMMUNICATION SWITCHING SYSTEM

[75] Inventors: Haruo Akimaru; Koichi Yamamoto; Ko Muroga, all of Tokyo; Hirotoshi Shirasu, Yokohama; Noboru Araki, Tokyo; Toshihiko Nakajo, Kawasaki, all of Japan

[73] Assignees: Nippon Telegraph & Telephone Public Corporation; Nippon Electric Co., Ltd.; Hitachi Limited; Oki Electric Industry Co., Ltd.; Fujitsu Limited, Tokyo, Japan

[22] Filed: July 28, 1971

[21] Appl. No.: 166,881

[30] Foreign Application Priority Data

Aug. 15, 1970 Japan .............................. 45/71159

[52] U.S. Cl. .............................................. 179/18 ES

[51] Int. Cl. .............................................. H04q 3/54

[58] Field of Search ................................. 179/18 ES

[56] References Cited

UNITED STATES PATENTS

| | | | |
|---|---|---|---|
| 3,409,877 | 11/1968 | Alterman et al. | 340/172.5 |
| 3,403,383 | 9/1968 | Kienzle et al. | 340/172.5 |
| 3,483,524 | 12/1969 | De Buck et al. | 340/172.5 |
| 3,478,173 | 11/1969 | Lapsevskis et al. | 179/18 ES |

*Primary Examiner*—Thomas W. Brown
*Attorney*—Richard C. Sughrue et al.

[57] ABSTRACT

A stored program controlled electronic communication switching system provided with central control units having access to a memory consisting of high speed memory devices and low speed memory devices, such as magnetic drums. The low speed devices co-operate with said high speed devices so that data can be transferred therebetween to reduce the cost ratio of the memory necessary to meet the service specification of the system. The system further comprises means for minimizing the access time to the low speed memory devices. The central control units and the low speed memory devices are of duplicated construction in order to provide high reliability. Furthermore facilities are provided to enable the system to operate in a fallback mode, should faults occur, by changing the allocation of the content of memories to thereby modify the processing mode of the system without altering the processing program itself.

4 Claims, 21 Drawing Figures

INVENTORS
HARUO AKIMARU, KOICHI YAMAMOTO,
KO MUROGA, HIROTOSHI SHIRASU,
NOBORU ARAKI, TOSHIHIKO NAKAJO
BY Sughrue, Rothwell, Mion, Zinn & Macpeak
ATTORNEYS

STORED PROGRAM CONTROLLED ELECTRONIC COMMUNICATION SWITCHING SYSTEM

BACKGROUND OF THE INVENTION

1. Field of the Invention

The present invention relates to an electronic communication switching system, more particularly to a stored program controlled electronic communication switching system used, for example, in telephone exchanges, video transmission services, data exchange services, etc.

2. Description of the Prior Art

Progress has been made in the design of communication systems both in regard to the quantity of data handled and the quality of operation. There is, however presently a need for a hybrid communication system which enables telephone communication and other data to be transmitted and received. A stored program controlled system is considered to be most suited to this need. Such a system comprises peripheral speech path equipment which can establish a number of speech paths in proportion to the number of subscribers or trunk lines, memory devices for storing the service program, memory devices storing data which is in proportion to the number of the subscribers and control means having a call handling capacity which is in proportion to overall traffic.

In general, where the numbers of subscribers decrease or where more service facilities are requested relative to the number of subscribers, the cost of the memory devices for the program, which is not in proportion to the number of subscribers or the overall traffic, is prohibitive. Moreover, as these systems become more complex and sophisticated their reliability decreases.

SUMMARY OF THE INVENTION

The main object of this invention is to provide an improved stored program controlled electronic communication switching system which enables the above mentioned disadvantages to be mitigated. More particularly, the invention seeks to obtain a more economical system by concentrating on the function of the memory devices used for the service program.

Another object of the invention is to economically provide a system having high reliability which is so adapted as to continue service even if there is a major fault in one of its component units.

Another object of the invention is to provide a system in which relatively cheap and slow speed memory devices, such as magnetic drums, magnetic discs or delay lines, can be used to provide the same function as the high speed memory devices.

Another object of the present invention is to decrease the access time to said economical slow speed memory devices so that the system can still handle more traffic.

A further object of the invention is to maintain the reliability of the control means of the system by interconnecting duplicated economical slow speed memory devices and duplicated central control units.

A still further object of the present invention is to economize the system by decreasing the number of high speed temporary memories by providing a common standby device and by allowing the system to operate in a fallback mode, by transferring the memory content from the slow speed memory to the high speed temporary memory.

An additional object of the present invention is to increase the rate of time that the central control means can apply to its internal processing by providing a call detector which detects a calling subscriber. Other features, aspects and advantages of the invention will become more apparent from considering the following description.

In one aspect the invention provides a stored program controlled electronic communication switching system comprising:

a. a plurality of slow speed memory devices, b. input-output processing devices connected to the slow speed memory devices, c. a plurality of high speed temporary memory devices, d. duplicated central control units adapted to operate in synchronism, said control units being composed of one unit for operation in an active mode and a further unit for operation in a passive mode, wherein said one unit controls said high speed temporary memory devices and each of the units is capable of independently controlling said input-output devices to execute a program.

The present invention provides essentially an electronic computer construction in which less frequent programs and data are accommodated in the economical slow speed memory devices and the programs and data are transferred into the high speed temporary memory devices and utilized therefrom. In this system low cost devices, such as magnetic drums or the like, are duplicated and used as the slow speed memory and the high speed temporary memory devices have a common standby device. The central control units are thus able to make one duplicated sub-system inoperative under fault conditions whilst maintaining perfect service performance of the overall system.

It is preferable to ensure that the access time of the slow speed memory devices is minimal. Accordingly, the system of the present invention has an advantageous feature which provides the readout of the earliest accessible duplicated information in the slow speed memory devices.

In general, the system is able to change its processing mode, without modifying the service program, by using the high speed temporary memory devices to accommodate a program for switching the service programs conventionally stored in the slow speed memory devices into the high speed temporary memory devices.

BRIEF DESCRIPTION OF THE DRAWINGS

In order to give a clear understanding of the present invention, an embodiment of the invention will be described by way of example only, with reference to the accompanying drawings, in which:

FIG. 2–1 is a schematic diagram depicting the redundancy facility of the central processor of the system in its normal operation mode;

FIG. 2–2 is a schematic diagram depicting the processor of FIG. 2–1 when either the central control unit CC or the magnetic drum unit MDU of the system is in a faulty condition;

FIG. 2-3 is a schematic diagram depicting the processor of FIG. 2-1 when one of the temporary memory devices is in faulty condition;

FIG. 3 is a schematic diagram depicting the redundancy facility of the peripheral equipment of the system;

DESCRIPTION OF PREFERRED EMBODIMENT

Figure 1:
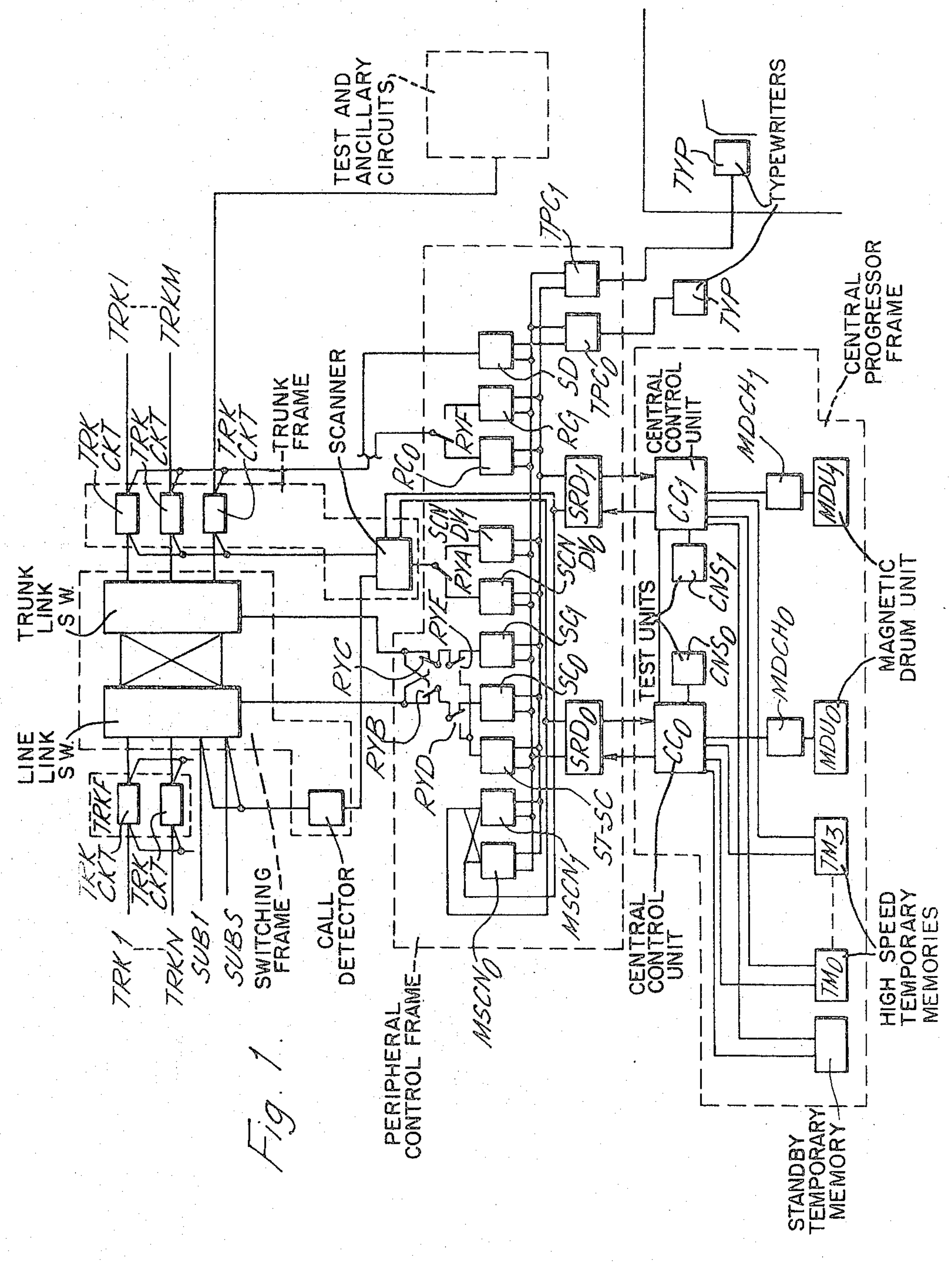
FIG. 1 is a block diagram depicting a system made in accordance with the present invention.

A preferred embodiment of an electronic telecommunication switching system will now be described under the following headings;

1. General outline of the system (FIGS. 1, 2 and 3)
2. The central control unit CC (FIG. 4)
2-1 Execution of an instruction (FIG. 5)
2-2 Data matching (FIG. 5)
2-3 Mate CC control (FIG. 5)
2-4 Interruption (FIG. 5)
2-5 Emergency action (FIG. 5)
2-6 TM access control (FIG. 6)
2-7 Peripheral control (FIG. 6)
2-8 TM switching control (FIG. 7)
2-9 Control of the magnetic drum channel device (FIG. 8)
2-10 Magnetic drum control (FIG. 8)
2-11 Temporary memory service (FIG. 6)
3. Speech path controller and call detector
3-1 Speech path controller (FIG. 10)
3-2 Call detector (FIG. 9)
4. Outline of speech connection (FIG. 11)
5. Program control operation
5-1 Explanation of programs
5-2 Accommodation of program and data in the memory TM
5-3 Program processing modes (FIGS. 5, 12, 13, 14, 15 and 16)
6. Magnetic drum unit (FIGS. 17, 18 and 19)
7. Supplementary remarks 1. General outline of the system FIG. 1 is a block diagram showing one embodiment of a system made in accordance with the present invention. In this figure, the symbols in each of the blocks represent the particular device or unit and the lines between the blocks represent the transference of data or control signals.

In FIG. 1, SUB1, . . . SUBS denote the individual subscribers and TRK1 . . . TRKM, TRK1 . . . TRKN denote the trunk lines. The subscribers SUB1 . . . SUBS are connected to a line link switch or switch unit LLS in a switching frame (SWF) and the trunk lines TRK1 etc. are connected to a trunk link switch or switch unit TLS in a switching frame (SWF) via trunk circuits TRKCKT in a trunk frame (TRKF). The switch units LLS and TLS are in the form of switching networks consisting of four stages of 8× 8 mechanical latching crossbar switches. The switching frame (SWF) further comprises a call detector unit CD and this call detector unit CD has connections to each of the subscriber lines in the line link switch unit LLS. The detector unit CD serves to detect any one of the calling subscriber SUB1 . . . SUBS and forms a code representative therof. The condition of the trunk circuits TRKCKT is detected by a scanner unit SCN.

The block denoted (SPCF) located at the center of the drawing and defined by a broken line is a peripheral control frame.

A central control unit CC and a distributor unit SRD are duplicated and the suffixes 0 and 1 denote the duplicate units. Accordingly, for convenience, wherever the duplicate units are referred to without their suffix it is assumed that either or both units is or are being referred to. This also applies to other units mentioned hereinafter.

The program controlled output or input instruction, address information or the like is applied to the distributor unit SRD in the peripheral control frame (SPCF). The distributor unit SRD is a device which distributes instruction signals and address information to the devices in the system and receives response signals from the devices. The lines between each of the blocks in the peripheral control frame (SPCF) show the transfer routes of such information. The main input to the frame (SPCF) is from the scanner unit SCN and this unit produces a binary coded output signal depending upon whether the current on the input line and corresponding to a designated address exceeds a threshold value or not. In this embodiment, the scanner unit SCN provides outputs from each of 16 scanning points in accordance with 0 – 256 binary addresses.

A scanner driver unit SCNDV, which again is of duplicated construction as denoted by the suffix 0 and 1, drives a sensor in the scanner unit SCN. Waveform reshaping is carried out by a sense amplifier in the scanner unit SCN and the re-shaped signal is sent to the distributor unit SRD. Either one of the duplicate units SCNDV is connected to the scanner unit SCN by means of a relay RYA. The remaining units of the frame (SPCF) are also duplicated but these units are not switched and the outputs of the two duplicated subsystems are sent to respective central control unit $CC_0$ or $CC_1$. The frame (SPCF) has a maintenance scanner unit MSCN, again of duplicated construction as denoted by suffixes 0 and 1. The unit MSCN scans input signals in response to binary coded 4 bits address information for each of the 16 scanning points. The frame (SPCF) also has a switch controller unit SC, a relay controller unit RC and a signal distributor unit SD. The switch controller unit SC and the relay controller unit RC are again of duplicate construction denoted by the suffixes 0 and 1. The switch controller unit SC energizes certain horizontal and vertical coils of the crossbar switches to select one switch according to the given address information. The selected switch is closed or opened as required. Normally, the switch controller unit $SC_0$ controls the line link switch unit LLS and the switch controller unit $SC_1$ controls the trunk link switch unit TLS, however, the unit $SC_0$ can control the trunk link switch unit TLS and the unit $SC_1$ can control the line link switch unit LLS, if a relay RYB or RYC is actuated. This function can be referred to as the home-mate switching function.

The unit designated ST-SC is spare equipment provided for large capacity operation and the unit ST-SC effects control of the line link unit LLS or the trunk link switch TLS by means of a relay RYD or RYE (herinafter this operation is referred to as the $n+1$ standby function).

The trunk circuits TRKCKT have several operation modes, such as loop or open on lines or the like. The particular mode is determined by the condition of a group of latched type magnetic relays and the relay controller unit RC drives these relays and supplies pulses to operate or to release a designated relay. Either one of the relay controller units $RC_0$, $RC_1$ is selected by a relay RYF.

The trunk circuits TRKCKT include service facilities such as a push button signal receiver, a multi-frequency sender, a dial pulse sender, etc. The pattern of multi-frequency pulses sent from the senders or continuation and discontinuation of the dial pulse sent from the sender is controlled by a signal distributor unit SD. The signal distributor unit SD is a group of flip-flop circuits, each of which is set or reset by a binary address. The output signal of each of the flip-flop circuits controls each relay of the service facility sender. The unit SD is not duplicated but it is so constructed as to have an access from either one of the duplicated central control units $CC_0$, $CC_1$ and moreover if the power source for part of the unit SD is disabled, the remaining part of the unit SD is operable.

A typewriter controller unit TPC, also duplicated, as denoted by suffixes 0 and 1, can be operated by keyboard instruction by tape reading, or the like. In FIG. 1 one typewriter TYP is shown as connected to each unit $TPC_0$, $TPC_1$ and each typewriter TYP is located at a remote maintenance center.

The block denoted (CPF) located at the bottom of FIG. 1 and defined by a dotted line is a central processor frame and serves to store program control data. In this embodiment the frame (CPF) has a high speed temporary memory collectively referred to as TM. The memory TM has, in this embodiment, four active devices $TM_0 - TM_3$ and one standby device ST-TM. Each of these devices is of identical construction and is essentially a core memory device able to read and write 4096 binary words each of which consists of 17 bits, i.e., 16 bits + 1 parity bit. Each device $TM_0 - TM_3$ is allotted a fixed higher order address and the whole memory has continuous address of $0 - (4096 \times 5-1)$. A variable higher order address is given to the device ST-TM so that it may take the place of any of the other four active devices $TM_0$ -$TM_3$. The memory TM contains program or data which may be readout, executed or modified by the central control units $CC_0$, $CC_1$. These units $CC_0$, $CC_1$ operate in synchronism with one other and execute an instruction after checking coincidence of performance with its internal matching circuitry. If one of the units $CC_0$, $CC_1$ becomes faulty, it is possible to disable that one unit so that only the other unit $CC_0$, $CC_1$ is operative. The units $CC_0$, $CC_1$ may also be controlled manually by a test unit CNS which is again duplicated as indicated by the suffixes 0 and 1.

A magnetic drum unit MDU again of duplicated construction, as represented by the suffixes 0 and 1, is each connected via a magnetic drum channel device $MDCH_0$, $MDCH_1$ to a respective one of the units $CC_0$, $CC_1$. The magnetic drum units $MDU_0$, $MDU_1$ record identical data, but the magnetic drum channel devices $MDCH_0$, $MDCH_1$ are not synchronized with one other, therefore either of the duplicate units $MDU_0$, $MDU_1$ is designated by the data to be readout and the contents of the units $MDU_0$, $MDU_1$ are identical.

A block denoted (MISCF) shown in the upper right hand portion of the FIG. 1 is composed of various test and ancillary circuits. A detailed explanation of the block (MISCF) will not be given since it is not an essential part of the present invention.

The duplication of the various units as mentioned hereinbefore enables an advantageous redundancy facility to be achieved as will now be described.

In this respect, a significant feature of the invention is the combination of the low speed magnetic drum memory MDU with a high speed temporary memory TM. As a basic rule of the system, less frequently used data is accommodated in the drum unit MDU. When required this data is transferred to a particular area of the temporary memory TM, which is referred to as an overlay area hereinafter, and then subsequently utilized for processing. In the memory TM, frequently used data and a program for controlling the transfer of data from the unit MDU are stored permanently. In the system of the present invention, therefore, the entire memory forms a hierarchic construction which consists of a relatively expensive high speed memory TM and a more economical low speed memory MDU. However, the memory system compares favourably with a conventional memory, provided with only large capacity high speed memories, so far as operation is concerned and is less expensive.

Another important feature in the system of the invention is that of the fallback mode of operation achieved by the provision of duplicated construction of the magnetic drum units MDU and the standby device ST-TM of the memory TM.

Figures 1, 2:
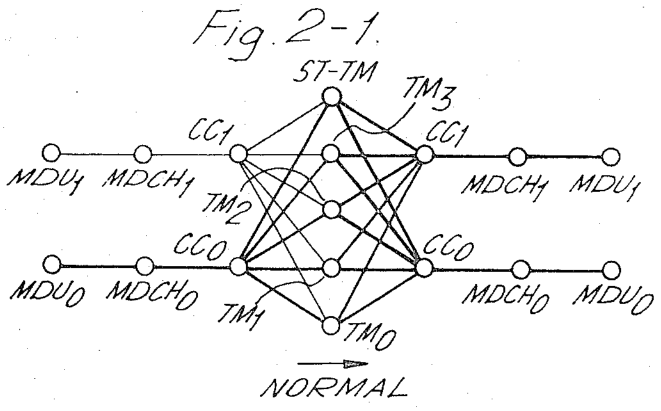
Figure 2:
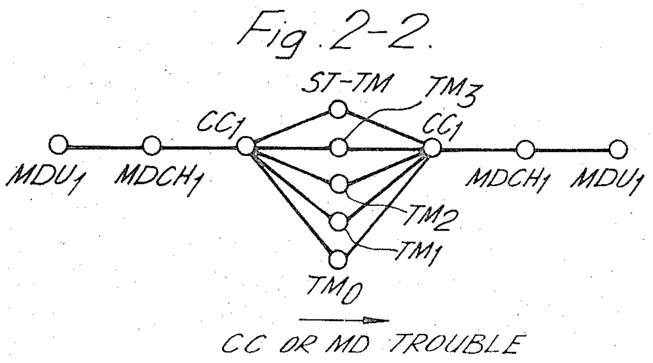

FIG. 2–1 is a diagram depicting the redundancy facility state of the system when the system is operating normally. In FIG. 2–1 the central control unit $CC_0$ is active and the central control unit $CC_1$ is passive. In this case, in the standby temporary memory device ST-TM an input-output processing program is stored permanently and in the active temporary memory devices $TM_0$ - $TM_3$ more frequently used data is accommodated. The devices $TM_0 - TM_3$ have two overlay areas of which, in the normal condition, one overlay area is used to transfer the internal processing program from the magnetic drum unit $MDU_0$ or $MDU_1$ for execution and the other overlay area is not used. The internal processing program is readout from one of the units $MDU_0$, $MDU_1$ and data is written into both of the units $MDU_0$, $MDU_1$. If a fault should occur in either of the magnetic drum units MDU, the magnetic drum channel device MDCH, the central control unit CC or in any of the combination of these units, the system switches into the mode shown in FIG. 2–2. In this state, except for the fact that data is only written into one of the units MDU, which is used for reading out the internal operational program, operation is same as during normal operation.

Consider now the condition when one of the active temporary memory devices $TM_0$ – $TM_3$ has a fault. In this case, the system operates in a state shown in FIG. 2–3, and the common standby temporary memory device ST-TM is substituted for the faulty memory device, for instance, $TM_0$. In this case, the input and output processing program which has been accommodated in the device ST-TM is no longer obtainable. Accordingly, the input and output processing program is transferred into the second overlay area of the device $TM_1$ –$TM_3$ which has not been used heretofore and is utilized therefrom. The input and output processing program is such that a different program can be derived at each 10 ms, thus making one cycle, for instance, at 200 ms. In this state, the control unit $CC_0$ is active and the magnetic drum unit $MDU_0$ transfers its internal processing program to the first overlay area provided in either one of the temporary memory devices just as in the state shown in FIG. 2–1. As mentioned above, the unit $MDU_1$ transfers the input and output processing program to the second overlay area provided in one of the memory devices TM. In order to clearly indicate this fact and also to show the fact that the unit $CC_1$ itself does not designate the address of a memory device TM, a chain dotted line is employed in FIG. 2–3. In this state shown in FIG. 2–3 the processing capacity of the system is slightly decreased when compared with the state depicted in FIG. 2–1. In the foregoing description it is assumed that the standby temporary memory device ST-TM is active during normal operation, but it is also possible to modify the system so that the device ST-TM provides a perfect standby facility and is not used normally. In this case the device ST-TM may just replace any other temporary memory device TM which is in faulty condition.

It may be understood from the foregoing that the system according to the present invention can operate even when a fault occurs in any one of its units CC, MDCH, MDU or TM. This is achieved by combining a duplicate auxiliary large capacity memory and a temporary memory operable in a fallback mode.

Figures 2, 3:
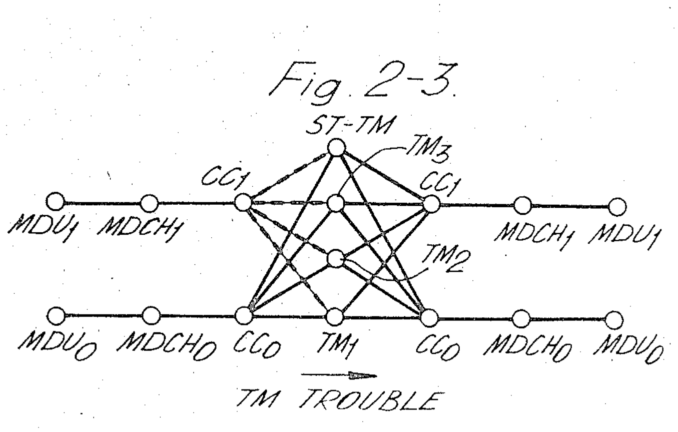
Figure 3:
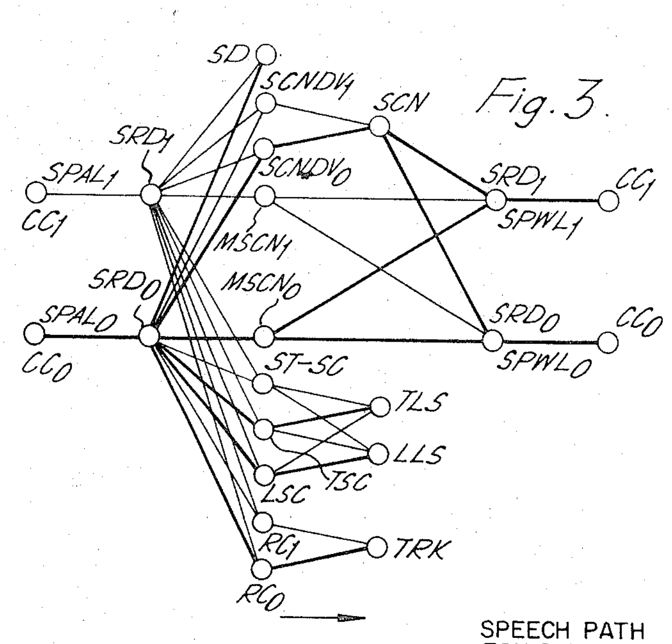

Considering the redundancy facility still further, FIG. 3 shows the redundancy facility for the peripheral devices of the system wherein the thicker lines show the flow of active control signals and the thinner lines show the auxiliary paths. As is clearly shown, at least two paths are provided for each peripheral device, and the signal receiver and distributor unit SRD may be considered as one part of the central control unit CC in view of the configuration shown.

2. The central control unit CC

Figure 4:
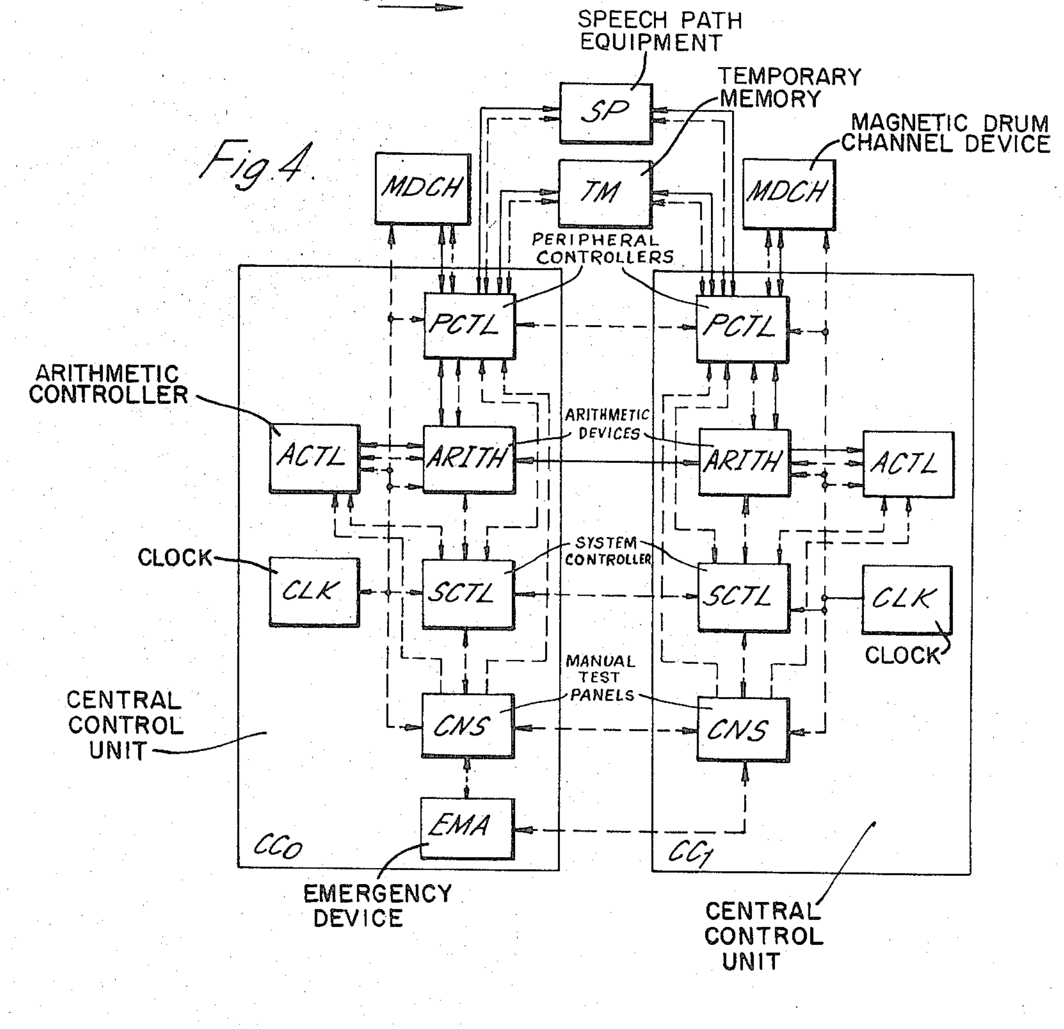
FIG. 4 is a block diagram depicting the central control unit CC of the system.

An embodiment of the central control unit CC will now be described with reference to FIG. 4. As before, broken lines interconnecting the components denote control paths and full lines denote data flow paths. It will be recalled that two units $CC_0$ and $CC_1$ are provided. Each unit consists of an arithmetic controller ACTL, an arithmetic device ARITH, a system controller SCTL, a peripheral controller RCTL, a clock CLK, an emergency device EMA and a manual test panel CNS. The probability of faults occurring in the emergency device EMA itself is small and hence this device is common to both units $CC_0$, $CC_1$. The operation of each device in the units $CC_0$, $CC_1$ will now be described.

The arithmetic controller ACTL produces a timing signal in accordance with the given instruction together with the result of a logic operation and controls the arithmetic device ARITH so that the necessary arithmetic operations are carried out therein. The system controller SCTL controls various operations in the unit $CC_0$, $CC_1$ and controls the arithmetic controller ACTL. The peripheral controller PCTL controls the peripheral devices such as the temporary memory devices TM, the magnetic drum channel devices MDCH, the speech path equipment SP, etc. The clock CLK produces clock pulses used to trigger various kinds of flip-flop circuits in the central control unit CC. The emergency device EMA only functions during an emergency as will be explained more fully hereinafter. The manual test panel CNS indicates the information signal given by the central control unit CC and the temporary memory TM and can manually alter the operational condition of the control unit CC.

2–1 Execution of an instruction

The execution of an instruction from the central control unit CC will now be described with reference to FIG. 5.

Figure 5:
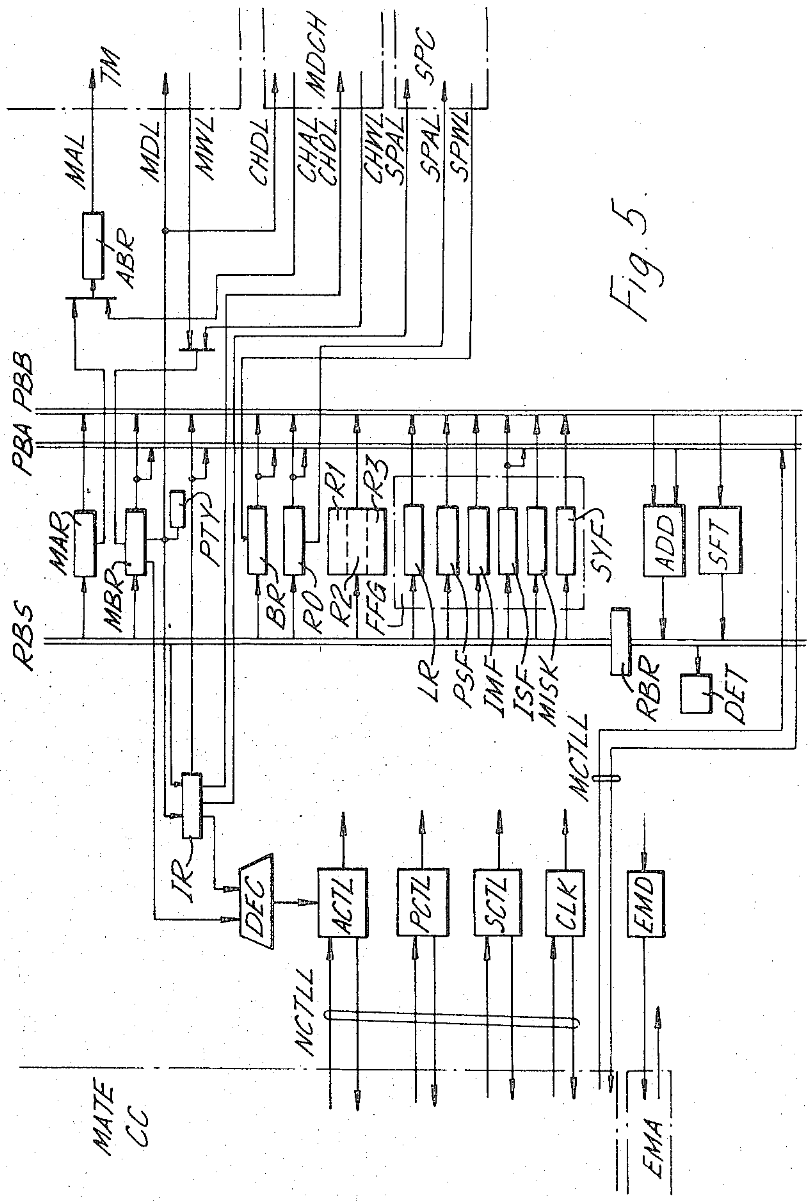
FIG. 5 is a block diagram depicting the arithmetic unit ARITH of the unit illustrated in FIG. 4.

In FIG. 5, a group of controlling flip-flops capable of reading and writing (or only reading) are indicated by a block FFG at the center of FIG. 5. The content of a register LR storing the address of an instruction within the above group FFG is readout to operand bus PBB and +1 is added by an adder ADD. The resultant signal is sent via a buffer register RBR and a result bus RBS to a memory address register MAR. The readout instruction for the temporary memory TM is then sent from the register MAR under control of the peripheral controller PCTL via a memory address buffer register ADR and memory address leads MAL.

The response signal from the temporary memory TM initiated by the above readout instruction is received by a memory buffer register MBR via memory answer leads MWL and parity of the signal is checked by a parity circuit PTY. The signal is then sent to an instruction register IR so as to be treated as an instruction signal. If a parity error is detected by the parity circuit PTY, the bit 1 is set into an interruption source register ISF in the group FFG.

The content of the instruction register IR Is decoded by a decoder DEC and the type of the instruction is identified. In case modification of the address is required, the adder ADD is controlled by the controller ACTL so that address modification is effected by the adder ADD. The modified address is then sent to the memory address register MAR. If the decoder DEC detects an abnormal instruction code, the bit 1 is set in the interruption source register ISF.

In case of an instruction to read out data from the temporary memory TM, this instruction is sent to the memory TM under control of the peripheral controller PCTL as described previously, and the data is read out into the memory buffer register MBR via the memory answer leads MWL.

In case of an instruction to write data into the temporary memory TM, the content of either of designated registers $R_0$, $R_1$, $R_2$, $R_3$, according to the instruction, is set into the memory buffer register MBR via the adder ADD and the buffer register RBR. A parity bit is added to the signal by the parity circuit PTY and the writing instruction is sent to the temporary memory TM under the control of the peripheral controller RCTL via memory data leads MDL.

In case of an arithmetic instruction, the content of either of the registers $R_0$, $R_1$, $R_2$, $R_3$, designated by the instruction and/or the data readout in the readout process discussed above is sent to the adder ADD or a shift circuit SFT via the operand buses PBA and PBB and the signal is processed by the appropriate logical operation, i.e., addition or subtraction, or the signal is shifted by the circuit CFT. The result is set in a register defined by the instruction or determined previously. The result of the logic operation is detected by a result detector DET according to whether the result is positive, negative, zero, etc., and the information derived is used to set a condition code flip-flop (not shown) which is a part of a register PSF used to indicate the operational condition of the group FFG.

In case of a control instruction intended for the magnetic drum channel device MDCH, an instruction is sent from an instruction register IR to the device MDCH via channel operand leads CHOL. Where data is to be transferred between the magnetic drum units MDU, the address of the memory TM is sent to a memory address buffer register ABR via channel address leads CHAL. The write-in data for the units MDU is derived from a memory buffer-register MBR via channel data leads CHDL and the readout data from the units MDU is sent to the register MBR via channel answer leads CHWL.

In case of an instruction concerning the speech path controller SPC, instruction signals are sent from the instruction register IR and also from the register $R_0$ to the controller SPC via address leads SPAL and the answer from the controller SPC is sent to a buffer register BR via speech path answer leads SPWL.

2—2 Data Matching

In normal operation, the two central control units $CC_0$, $CC_1$ execute an instruction in synchronism with each other as controlled by a clock signal and at any one time each unit $CC_0$, $CC_1$ contains data, which data is to be matched at each instruction. Both the units $CC_0$, $CC_1$ effectively exchange their data through the operand buses PBA, PBB each time an instruction is executed and the data is sent to the adder ADD via control lines MCTLL. This data is cross-checked for time coincidence and sense, and if the data from the units $CC_0$, $CC_1$ is matched with one another the units $CC_0$, $CC_1$ execute the instruction processing sequence. If matching is not obtained, a corresponding bit is set in the interruption source register ISF.

2–3 Mate CC Control

Each of the control units $CC_0$, $CC_1$ controls the other control unit $CC_0$, $CC_1$ in order to maintain the operational function of the system. This type of control is termed "mate CC control" and is initiated by the controller SCTL. The interchange of the controlling signals is effected via control lines NCTLL.

2–4 Interruption

An interrupting facility is provided to temporarily interrupt the active instruction process sequence and to initiate a new process; the former process being continued subsequently. This facility is termed "interruption" and the conditions for interruption are memorized in the interruption source register ISF.

In some circumstances it may be desirable not to initiate the interruption procedure. For this purpose there is provided an interruption mask function and the conditions where masking is to be initiated are memorized in a mask register IMF.

If interruption conditions exist, in other words, if conditions match a source set in the register ISF and if the conditions do not match any of the sources set in the mask register IMF, then the content of the register LR, the register PSF and the register ISF are transferred into a particular area of the temporary memory TM (not shown) under control of the system controller SCPL and the register PSF and the register LR are set to a new pattern in order to transfer control to the interruption program.

Return to the interrupted program is effected by resetting the register LR, PSF and ISF with the data removed by the previous instruction.

2–5 Emergency Operation

The emergency device EMA is provided to reestablish operation of the system when there is a fault unrecoverable by a program alteration.

The following phenomena are considered as system faults and are detected by an emergency source detector EMD which initiates the emergency device EMA.

a. Overflow of a fault detecting timer in the control unit CC.

b. A loss of power in the control unit CC or discontinuation of clock pulses.

c. Mismatching between the operating mode bits of the control units CC.

d. Overflow of an emergency timer (provided in the device EMA) for counting the time which has elapsed after enabling the device EMA.

After start of the emergency action, the various control circuits in the control unit CC under control of the system controller SCTL, the peripheral controller PCTL, etc. are reset and the alteration in the operational condition of the control unit CC is indicated by the part of the flip-flop group FFG. Thereafter alteration of memory configuration, the initial program loading to the temporary memory TM from the magnetic drum unit MDU and the like is carried out by predetermined logic. The emergency device EMA now reestablishes several effective combinations of units in the sub-system in sequence. This situation is termined as the "emergency state" and a miscellaneous register MISK memorizes each combination, i.e., emergency cycle, to be realized by the emergency device EMA. The emergency device EMA effects modification of the initial program loading from the magnetic drum unit MDU and thereafter sets bit 1 in the interruption source register ISF so that a further progress is executed by the program. Each time an emergency cycle is commenced this is detected by a counter (not shown) in the device EMA and if more than a predetermined number of cycles are started in a predetermined period this is indicated in the miscellaneous register MISK by a bit 1 and an alarm signal is sent to peripheral supervising equipment (not shown).

2–6 Access Control To Temporary Memory TM

The facility for access control to the temporary memory TM will now be described with reference to FIG. 6. The access control to the memory TM is effected by a memory traffic controller TRC in the peripheral controller PCTL and by the system controller SCTL, and the access to the temporary memory TM is made only from the central control unit CC when in an active mode. The particular memory TM to be accessed is decided by the higher order three bits of the memory address in the buffer register ABR and by the content of a spare memory name register SNR, which forms part of a system state indicating register SYF controlled by the memory traffic controller TRC. A designator Y indicating whether the control unit CC is in an active mode or passive mode is provided in the system state indicating register SYF. The designator Y is under control of the system controller SCTL, and access is made only from a central control unit CC, which is in active mode, for instance, access can be made from the active unit $CC_0$ to the temporary memory TM via memory address leads MAL. The spare memory name register SNR may also form part of the temporary memory TM. It is also possible to locate the spare memory name register in the central control unit CC and in the temporary memory TM. In this case either one of the registers SNR would operate.

Write-in data to the memory TM is sent via memory data leads $MDL_0$, and answer from the accessed memory TM is sent back to both of the control units $CC_0$, $CC_1$ and to the memory buffer register MBR via memory answer leads $MWL_0$ and $MWL_1$. The memory traffic controller TRC serves to unify the access requests from the control unit CC and from the peripheral equipment such as the magnetic drum channel device MDCH or the like since the access request from such peripheral equipment is also controlled by the peripheral controller PCTL.

2–7 Peripheral Control

Figure 6:
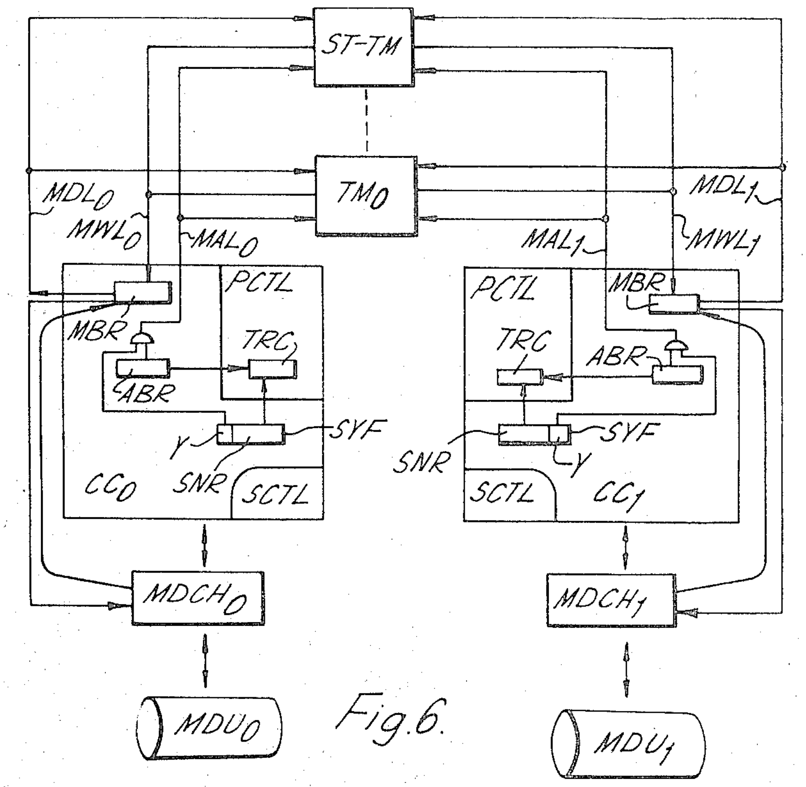
FIG. 6 is a block diagram depicting the access control of a temporary memory unit TM of the system.

As shown in FIG. 6, the controlling instruction from the central control unit CC to the peripheral equipment is sent only from the active unit as designated by the designator Y via speech path address leads SPAL (FIG. 5) to the speech path controller SPC.

2–8 Switching Control Of The Temporary Memory TM.

Figure 7:
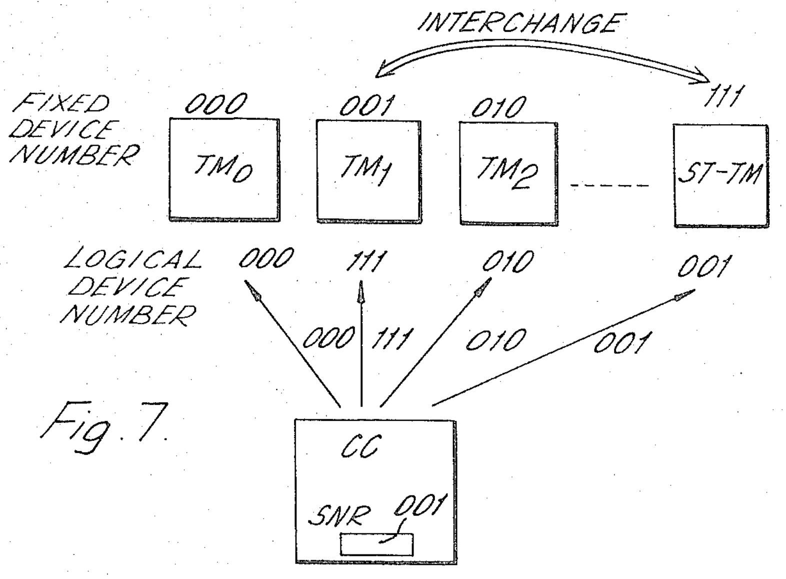
FIG. 7 is a schematic diagram depicting the switching of the temporary memory TM.

Switching control of the temporary memory TM will be described with reference to FIG. 7.

A number allotted to the memory devices $TM_0 - TM_3$ and ST-TM in relation to the central control unit CC is defined in two ways. The first definition is a fixed device number which is given to each unit by its physical connection in the hardware and the second definition is a logical device number by which the devices may be identified logically. According to the program the temporary memory TM is activated by the unit CC bearing the appropriate fixed device number and the unit CC has access to the memory TM by utilizing the logical device number. Normally the spare memory name register SNR is set as '111' and in this case all the fixed device numbers are of the with logical device numbers. In other words, normally the central control unit CC has access to the temporary memory TM having the fixed device number as designated by the program.

The content of the spare memory name register SNR may be set by the program. If the content of the register SNR is other than '111,' for instance, if it is '001,' the logical device number of the temporary memory TM having its fixed device number '111' is set into the register SNR and the logical device number of the temporary memory TM having its fixed device number '001' is set to '111.' If access to $TM_1$ is designated by a program, the unit CC has access to the standby device ST-TM and as mentioned above access is possible between the device ST-TM and any one of the temporary memory devices of the memory TM. This is an especially advantageous feature of the system.

2–9 Magnetic Drum Channel Device Control

The magnetic drum channel device control will now be described with reference to FIG. 8. In this figure, the full lines again denote data paths and broken lines denote control paths. The magnetic drum channel device MDCH is controlled by the peripheral controller PCTL. One central control unit $CC_0$, $CC_1$ controls only one magnetic drum channel device MDCH, i.e. the unit $CC_0$ controls the device $MDCH_0$ and the unit $CC_1$ controls the device $MDCH_1$. If data is to be read out from the magnetic drum unit $MDU_0$ both the units $CC_0$ and $CC_1$ send instruction to the magnetic drum channel device $MDCH_0$. By the logic product of a channel designating signal in the instruction register IR and the signal in a designator X, which designates the flip-flop for the magnetic drum channel device MDCH, a signal is sent only to the magnetic drum channel device $MDCH_0$ via control wire CHCTLA and the instruction is sent only from the unit $CC_0$ to the magnetic drum channel device $MDCH_0$ via control wires CHCTLW. The readout data is sent to the temporary memory TM under the control of the peripheral controller PCTL via the memory buffer register MBR. If the unit $CC_0$ is given a request for access to the memory TM from the magnetic drum channel device $MDCH_0$, the other unit $CC_1$ is prohibited from access to the memory TM until the unit $CC_0$ has completed its function. On the other hand response signals and information from the device $MDCH_0$ are sent back to both units $CC_0$, $CC_1$ via control line CHCTLW and cross lines between the two units $CC_0$, $CC_1$. Both units $CC_0$, $CC_1$ can thus continue synchronized control of the device $MDCH_0$.

2–10 The Magnetic Drum Control

The operation of the magnetic drum system will be further explained with reference to FIG. 8. Each magnetic drum system denoted 0 and 1 is composed of the magnetic drum channel device MDCH, which effects information transfer to the temporary memory TM, a magnetic drum periphery device MDUE, which effects the selection of the tracks on the drum MDU, the supply of write-in driving currents, the detection of the timing track signal, the detection of readout signal, etc., under control of the device MDCH and a magnetic drum mechanism MDUU with information tracks and a track selecting matrix therefore, and a motor and its associated driving circuit.

A clock signal is produced by a pattern on a clock track CLKT of the magnetic drum mechanism MDUU and is detected by a clock detecting circuit TDET. The magnetic drum channel device MDCH effects readout of data from, and write-in of data to, the magnetic drum mechanism MDUU. The clock signal is sent to the central control unit CC at predetermined periods, e.g., 10 milliseconds, via control lead CHCTLW and is used to set a 1 bit in the interruption source register ISF. By this setting of 1 bit in the register ISF, interruption occurs in the unit CC.

The normal operation of the magnetic drum channel device MDCH at the time of reading and writing from the magnetic drum unit MDU is as follows. When a starting instruction is sent to the respective magnetic drum channel device MDCH from either one of the central control units $CC_0$, $CC_1$ if the device MDCH is in an operable condition, the instruction may be interpreted and if the instruction is to write-in or readout data, the input-output control order (address of data location to be transferred, address of original data location, number of words in transfer, etc.), prepared previously in the temporary memory TM, is transferred from the memory TM to a control register (not shown) in the channel device MDCH. The device MDCH also provides a signal in response to the starting instruction produced by the unit $CC_0$, $CC_1$ by means of a condition coder CDC which represents the operating status of the device MDCH. This response signal is sent back to the central control unit CC via control leads CHCTLW. After this initial action, the operation of the device MDCH is effected independently of the central control unit CC.

The device MDCH ascertains the location of objective data by an input-output control order read out from the temporary memory TM. The device MDCH confirms the coincidence of the data location and thereafter transmits a request for access to the memory TM to the peripheral controller PCTL of the control unit $CC_0$, $CC_1$ via the control leads CHCTLW. Data transfer is then effected via the memory buffer register MBR under the control of the memory traffic controller TRC in the controller PCTL. This operation is repeated for each word. The device MDCH also serves to transfer the content of the register LCR indicating the position of rotation of the drum unit MDU to the control unit CC. If the transfer is completed, a channel status word CSW indicating the operational status of the magnetic drum system as the time of completion of the transfer operation is stored in a predetermined area of the temporary memory TM and bit 1 is set in the interruption source register ISF via the control leads CHCTLW to notify the completion of the operation to the control unit CC.

2–11 Temporary Memory

Some further explanation of the operation of the temporary memory TM will now be given by referring back to FIG. 6. The temporary memory TM is connected to the respective central control units $CC_0$ and $CC_1$ via respective individual leads and the operation of the memory TM is commenced when a signal designating information is sent from either of the units $CC_0$, $CC_1$ under the control of its peripheral controller PCTL. An address designating signal is sent from the central control unit CC which is sending the information designating signal to the memory TM, via either one of memory address leads $MAL_0$ or $MAL_1$. The response signal from the memory TM is sent back to the respective memory buffer register $MBR_0$, $MBR_1$ via memory answer leads $MWL_0$ and $MWL_1$.

When readout operation is designated, the readout information is rewritten into the temporary memory TM and when a write-in operation is designated, information is sent from the central control unit $CC_0$, $CC_1$ which has sent out the information designating signal, and written into the temporary memory TM.

3. Speech Path Controller And Call Detector

The speech path equipment in this embodiment of the present invention is in the form of a relatively small size unit of mechanical latching type crossbar switches having speech path network configurations known per se. However, any kind of space division switching network can be used to provide the speech path control according to the present invention.

3–1 Speech Path Controlling Equipment

The speech path controlling equipment (SPC) will now be described with reference to FIG. 10. The term speech path controlling equipment includes the switch controller SC and the typewriter control unit TPC, etc., in the peripheral control frame SPCF. The previously home-mate switching configuration or $n + 1$ standby facility can be utilized to improve the reliability of this equipment without undue increase in costs.

The decoding address information for controlling the speech path equipment is isolated from the central control unit CC so that the latter is made simpler.

Figure 10:
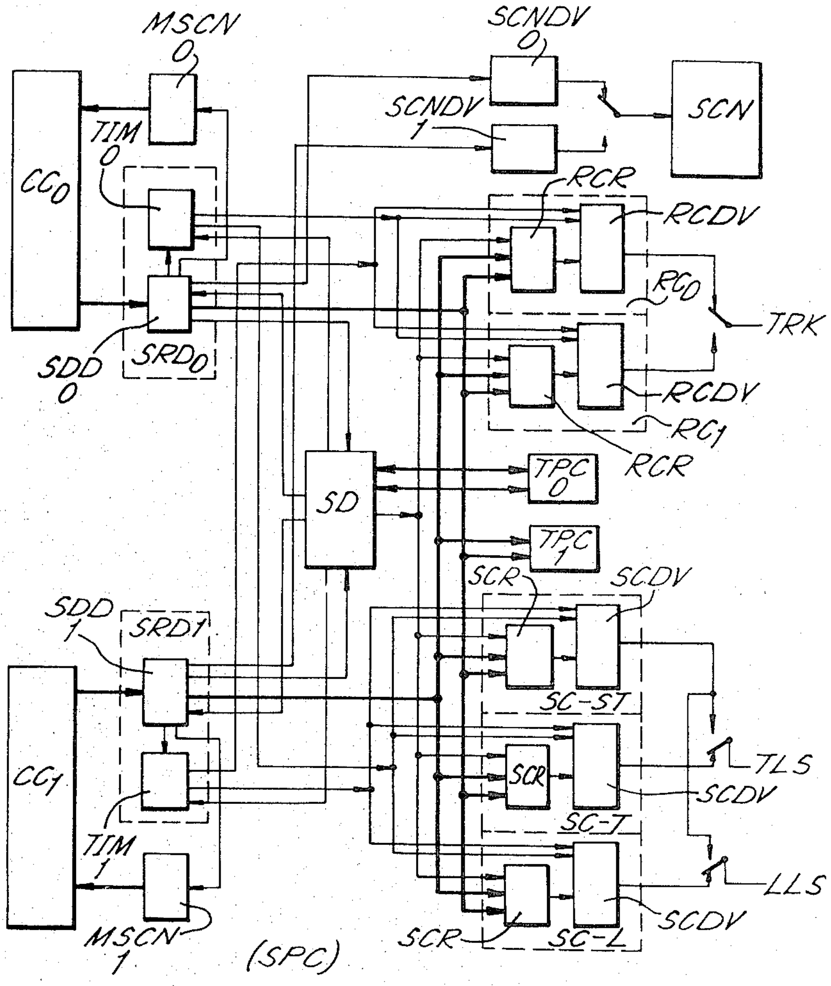
FIG. 10 is a block diagram depicting the speech path controller SPC of the system.

Referring now to FIG. 10, SDD denotes a signal decoder and distributor device and TIM denotes a control clock pulse distributor device. The combination of the two devices SDD and TIM is referred to as the signal receiver and distributor SRD. Also in FIG. 10, MSCN is the maintenance scanner, SC the switch controller, RC is is the relay controller, SCNDV is the scanner driver, and TPC is the typewriter controller.

The signal receiver and distributor SRD receives information used to control the speech path equipments from the central control unit CC and distributes such information to the respective devices. More particularly, the signal decoder and distributor device SDD and the control clock pulse distributor device, TIM, which is started by the device SDD and produces clock pulses, co-operate so that information is interchanged between the signal receiver and distributor SRD and the central control unit CC. The information may be interchanged directly and a buffer register may thus be dispensed with and the clock pulses may be produced by a common generator.

The switch controller SC consists of a switch controller register SCR and a switch controller driver SCDV. The switch controller register SCR sets the signal information for the designated magnets of particular mechanical crossbar switches as determined by a signal from the device SDD and the clock pulse derived from the device TIM. The switch controller driver SCDV controls the operation and release of one or more switches to define a requested speech path by using the above-mentioned set signal. The switch controller SC is further classified according to its operation such as SC-L, SC-T, SC-ST, etc. The controller SC-L controls the line link switch LLS, the controller SC-T controls the trunk link switch TLS and the controller SC-ST is a spare device for taking the place of the switch controller SC-L or SC-T if these devices should develop a fault. If the traffic is very small, it is possible to dispense with the spare device SC-ST and to arrange a home-mate switching configuration between the switch controllers SC-L and SC-T.

The relay controller RC consists of a relay controlleR register RCR and a relay driver RCDV. The relay controller register RCR sets the information for the designated relays in the trunk system in accordance with a signal derived from signal decoder and distributor device SDD and by the clock pulses supplied by the device TIM determining the operational sequence of the relays. The relay driver RCDV controls the operation and release of designated relays by the above set signal and the duplicate construction of the devices RCR and RCDV provides one spare arrangement designated $RC_1$ and one active arrangement designated $RC_0$.

The scanner driver SCNDV provides a driving signal for selecting a row in the decoder matrix of the scanner SCN under control of a signal derived from signal decoder and distributor device SDD and is also of duplicate construction.

The maintenance scanner MSCN supervises the operational status of each device in the speech path controlling equipment (SPC). A signal distributor SD serves to distribute the signal for high speed operation to the necessary parts in the speech path controlling equipment (SPC), and this initiates operations such as release of the relays to switch over from an active device to the associated spare device and the designation of the operating mode for the switch controller SC or the relay controller RC.

The typewriter controller TPC is used to enable manual communication with the system for maintenancee purposes.

The operation of the equipment (SPC) is as follows. A speech path control signal is sent from the central control unit CC to the signal decoder and distributor device SDD. The signal decoder and distributor device SDD then checks for errors in the received signal and if the signal is in order, the signal is decoded for the device designations. The signal decoder and distributor device SDD now selects the designated switch controller SC, the relay controller RC, the signal distributor SD, the scanner driver SCNDV, etc. by using the decoded information. At the same time, the device SDD transmits the designated information received from the central control unit CC to the selected devices. For instance, if driving information for the switch controller SC-L is received from the central control unit CC, the signal decoder and distributor device SDD decodes the number or location of the element of the switch controller SC-L and the driving information is set in the switch controller register SCR of the controller SC-L. At the same time the device SDD sets up the clock pulse distributor device TIM so that clock control of the switch controller SC-L can be effected by the clock pulses. The relay controller RC is operated in the same way and under control of the relay controller RC, the designated magnet of the designated switch or relay may be actuated.

3–2 Call Detector

Figure 9:
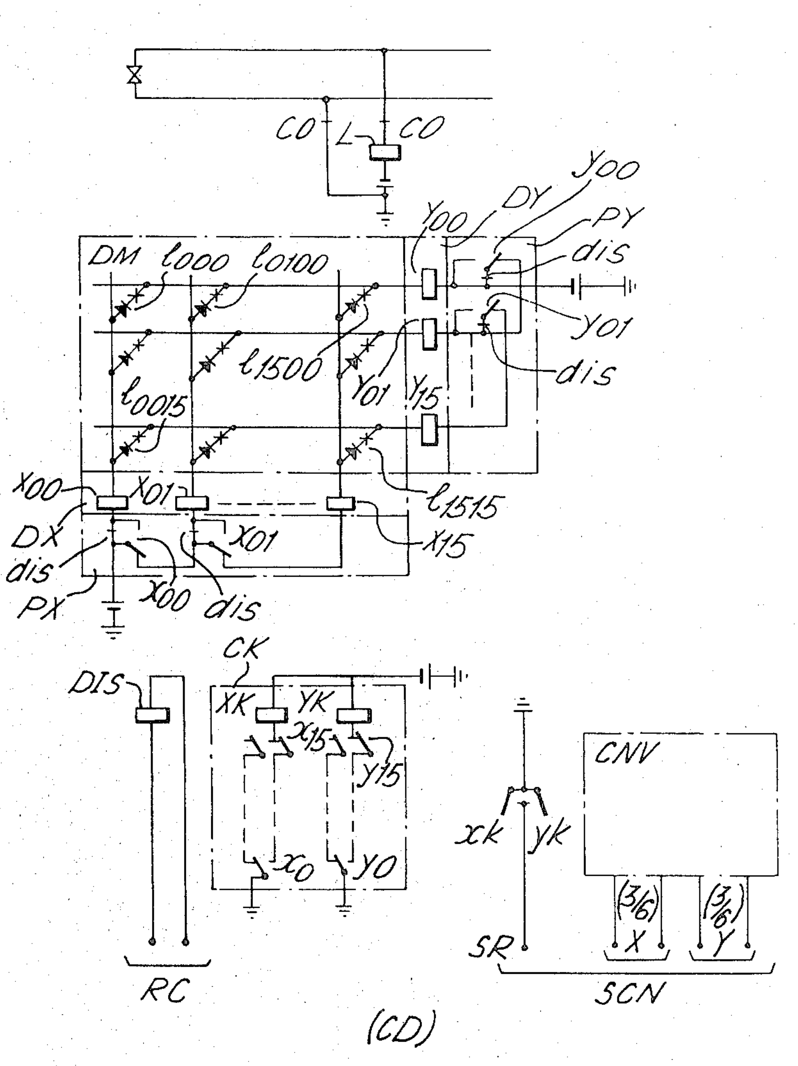
FIG. 9 is a circuit diagram of the call detector CD of the system.

FIG. 9 depicts the call detector CD, which identifies the calling subscriber and generates a code which is accommodated in the scanner SCN. A control lead from the relay controller RC is connected to the call detector CD and re-setting of the detector CD is controlled via this control lead.

The call detector CD comprises a diode matrix DM, detecting relay circuits DX, DY, priority sequency designators PX, PY, a supervisory circuit CK and a code converter CNV. L denotes a line relay and CO denotes cut-off relay contacts.

In this system the supervisory points of a plurality of subscribers are divided into several blocks, and one element of the call detector CD is provided for each block, the individual points of a block being disposed in a matrix corresponding to the diode matrix DM. The diode matrix DM is a matrix of 16 rows and 16 columns having its cross points formed from a series circuit composed of a diode and a contact $e_-$ of the subscriber line relay L. The code converter CNV serves to convert the information concerning the selected relays X _ and Y _ into binary coded information.

In general, if a subscriber accommodated in the call detector CD lifts his handset or performs an analogous action termed the "off-hook condition" relays X _ and Y _ in the detecting relay circuits DX, DY and relays XK, YK in the supervisory circuit CK operate and a service request signal SR is sent to the scanner SCN over a lead SR and via contact circuits *xk* and *yk*. The service request signal notifies the scanner SCN that at least one subscriber belonging to a particular block is in a calling condition. Thus the calling conditions for a plurality of subscribers in a block are sent to the scanner SCN via the single lead SR. At the same time, the allocated number of the subscriber is set in the diode matrix DM by operating relay contacts in the detecting relay circuits DX, DY. This information is transferred to the scanner SCN after applying code conversion in the code converter CNV. The scanner SCN detects the information signal and the central control unit CC (FIG. 1) is then supplied with the information relating the number of the subscriber. The central control unit CC then effects a connection between the calling subscriber and an originating register trunk ORT.

This operation will now be considered in more detail. When all the subscribers accommodated in the call detector (CD) are in a non-operating condition, i.e., the "on-hook" condition, all the contacts $e_-$in the diode matrix DM are in the open condition so that none of relays $X_-$ or $Y_-$ in the detecting relay circuits DX, DY operate and hence no information is transmitted to the scanner SCN. From this situation if a subscriber, for instance, a subscriber corresponding to the contact $e_{000}$ lifts his handset, relay $X_{00}$ in the detecting relay circuit operates via a circuit extending through said contact $e_{000}$. The operation of the relay $X_{00}$ causes a relay XK in the supervisory circuit to operate and this relay XK operates after confirming that only one relay in the circuit DX is operative. The relay XK holds the relay $X_{00}$ and energizes the relay $Y_{00}$ in the detecting relay circuit DY via a circuit not shown in detail. The operation of the relay $Y_{00}$ causes a relay YK in the supervisory circuit CK to operate again after confirming that only one relay in the circuit DY is operative. The relay YK holds the relay $Y_{00}$ and sends out a service request signal to the scanner SCN via the lead SR. At the same time information concerning the calling subscriber's allocated number in the diode matrix DM is sent to the scanner SCN from the code converter CNV as a binary coded signal. If another subscriber lifts his handset the circuits supplying current for the respective relays X and Y in the detecting relay circuits DX and DY are cut off by the contacts $x_{00}$ and $y_{00}$ of corresponding relays $X_{00}$ and $Y_{00}$ so that these relays $X_-$, $Y_-$ cannot operate simultaneously and the information concerning the calling subscriber sent to the scanner SCN is not disturbed. The central control unit CC processes the desired calling connection after scanning the service request signal SR and the output information from the code converter CNV both accommodated in the scanner SCN. After confirming the completion of the calling connection, a restoration signal is sent from the relay controller RC to the call detector CD. The call detector CD responds to the restoration signal by operation of a relay DIS.

The relay DIS disables the operating circuit of the relays $X_{00}$ and $Y_{00}$ in the detecting relay circuits DX, DY and the relay controller RC confirms restoration of both the relays $X_{00}$, $Y_{00}$ and then restores the relay DIS to bring the call detector CD into the initial operating state.

After restoration to its initial condition the detector CD recommences call detection and if there is no subscriber requesting connection, the call detector CD may wait for the next call in the same condition.

4. Outline of Speech Connection

The control of the system for speech connection is defined by a program sequence stored in the memory. The system cannot be operated by the hardware only, contrary to the conventional electro-mechanical switching systems, and the system performs exchange functions by utilizing software defining the service function. The operation of the system in this respect will be explained with reference to FIG. 11.

Figure 11:
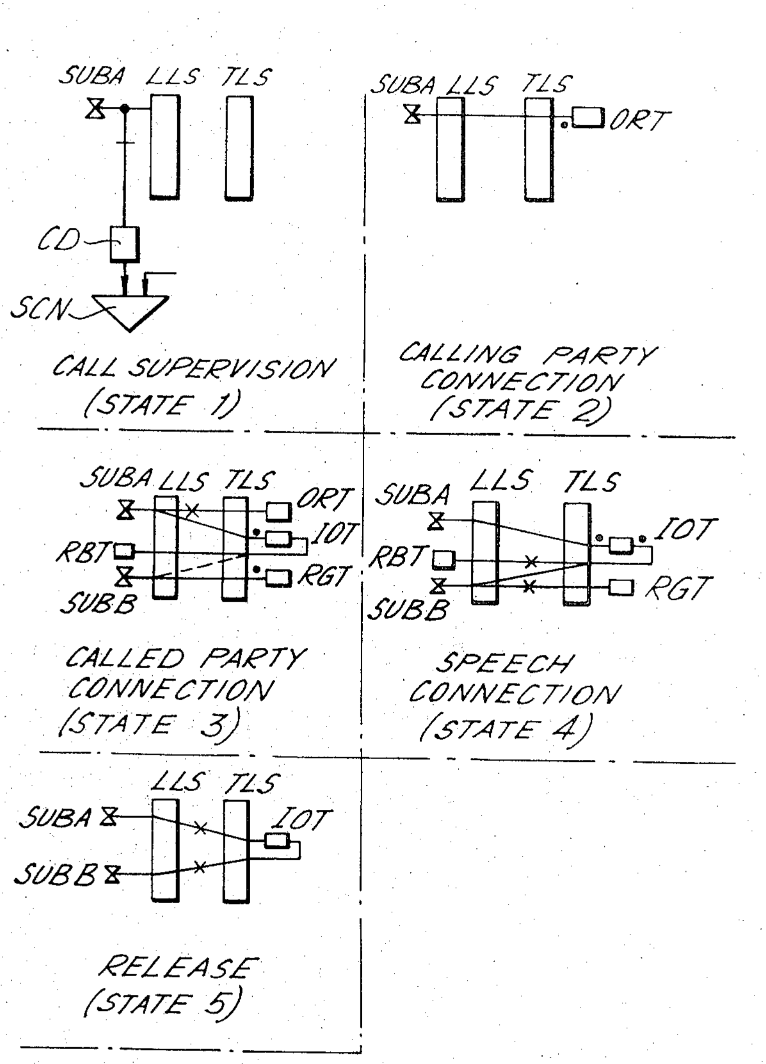
FIG. 11 are schematic diagrams depicting the process of controlling a call from a subscriber.

State 1 of FIG. 11 is a call supervision state; in which the scanner SCN is determining the calling condition of a subscriber by scanning the lead SR which transfers the service request signal from the call detector CD to the scanner SCN. It will be recalled that the call detector CD employs the matrix DM having 16 rows and 16 columns thus accommodating 256 subscriber lines in one block. If at least one subscriber in the block requests call connection, the call detector CD transmits a service request signal to the scanner SCN via the lead SR. The central control unit CC detects this request depending upon the result of scanning of the lead SR. If no service request signal is detected on the lead SR, the central control unit CC re-activates the search for service request during the next 200 milliseconds. If a service request is detected, the central control unit CC identifies the number of the respective subscriber on the line link switch LLS, depending upon the information of the scanner SCN, and then calls for the class of the calling subscriber to be read out from the magnetic drum unit MDU. The calling subscriber class is stored as information indicating whether the calling subscriber is an exclusive line subscriber, a party line subscriber, or a call from a public telephone. Further information such as the type of telephone device, e.g., dial type or push button type, or whether the subscriber is prohibited from calling can be stored.

Depending upon the class of the subscriber, the central control unit CC next selects one free originating trunk ORT from a plurality of dial pulse receiving trunks and establishes calling party connection as indicated in state 2 of FIG. 11. In the conventional crossbar-switch telephone exchange system, speech path connection between a calling subscriber and the originating register trunk ORT is established by using a different third lead termed as the "C-lead." In this system high speed is a characteristic of the central control unit CC and the conventional connection is unsuitable. In the present embodiment information concerning the trunk connections or links available is stored in a data area of the temporary memory TM termed as "map." The central control unit CC refers to this information at the necessary time and establishes optimum link matching. After the completion of link matching, the central control unit CC sends out the connection order to the switch controller SC and to the relay controller RC and connection is established between the calling subscriber and the originating register trunk ORT. A dial tone is now sent to the calling subscriber from the originating register trunk ORT.

The central control unit CC supervises the operating status of the originating register trunk ORT at every 10 milliseconds via the scanner SCN to detect the number dialled by the subscriber and this information is stored in a transaction memory control block TCB, which is provided in the memory TM and not shown in FIG. 11. Upon completion of counting and storing of all of the digits of the dialled number the central control unit CC reads out data memorized on the magnetic drum unit MDU, and decodes information concerning the called subscriber. This information would be, for example, whether or not the subscriber is an intra office subscriber or whether or not the called subscriber is engaged with a third party. The control unit CC now establishes connections as shown as state 3 in FIG. 11 and selects an idle ring back trunk RBT for sending a ring back tone to the calling subscriber, an idle ringing trunk RGT for sending a ringing signal to the called subscriber, and an idle intra-office trunk IOT to use at the answer of called subscriber. The control unit CC also makes link matching between the calling subscriber (SUBA) the trunk IOT and the trunk RBT and between the called subscriber (SUBB) and the trunk RGT based on the aforesaid map information in the temporary memory TM which represents the operational state of the trunk connections. Also in order to establish immediate speech connection when the called subscriber (SUBB) answers, an idle link between the called subscriber (SUBB) and the trunk IOT is selected and is reserved for the subsequent speech connection. In order to change from state 2 to state 3 in FIG. 11 the central control unit CC must send connection orders to the switch controller SC and the relay controller RC, but these processes are analogous to the calling party connection described in state 2.

During the called party connection the operational state of the trunks RGT and IOT is supervised by the scanner SCN at certain time intervals to detect the answer of the called party or the abandonment of the call by the calling party. If the called party answers the reserved speech connection between the called subscriber (SUBB) and the trunk IOT is now established and the speech path between the trunks IOT and RBT is disconnected as shown in the state 4 of FIG. 11. During the speech connection, the central control unit CC sends out scanning order at each 100 milliseconds to the scanner SCN and supervises the connection of the trunk IOT. The central control unit CC stores the result of each scanning cycle in the temporary memory TM and matches the result with the result of previous scanning cycle. If a variation in state is detected, the unit CC assumes that the call has terminated and a disconnection process is effected as follows:

a. Either the calling or called party replaces his handset and within a certain period of time the other party also replaces his handset. In this case all the connections are restored at once.

b. If one party delays replacing his handset the supervisory process is continued and if after a set time the party has not disconnected his appliance a forced disconnection process is effected.

5. Program Control Operation

The program control operation will now be described. It will be recalled that the memory for the system is formed by the temporary memory TM and the magnetic drum unit MDU. The temporary memory TM accommodates high usage program and data or that requiring real time process. The other program and data are accommodated in the magnetic drum unit MDU and are arranged to be transferred into the overlay area of the memory TM when required. Thus this arrangement provides a memory of hierarchic configuration.

The magnetic drum unit MDU is of duplicated construction whereas the temporary memory TM is a single item. It is, however, arranged to use one of the units MDU as a replacement for the memory TM if the memory TM becomes faulty. The temporary memory TM itself is also constructed so that a standby device ST-TM may take the place of any of the other devices $TM_0$, $TM_1$, $TM_2$, $TM_3$.

The allocation of accommodation for the program and data in the memory TM and the unit MDU is effected in the following manner in order to exploit these redundancy features. The temporary memory devices $TM_0$ – $TM_3$ accommodate the program and data information which should always exist in the memory TM in view of its usage and real time process requirement. In the standby memory device ST-TM, the programs, which may be transferred from the unit MDU when one device of the memory TM is out of action are accommodated. In each of the duplicated magnetic drum units MDU, the total system program data composed of all of the fixed data and variable data of less access frequency is accommodated. For the memory devices $TM_0$ – $TM_3$, overlay areas are provided for receiving program and data information accommodated in the magnetic drum unit MDU.

5–1 Explanation of Programs

The system program comprises:

execution control program, call processing program, fault recovery program.

The execution control program is a group of master programs for controlling the execution of various other programs, e.g., the call processing program and the fault recovery program, the interruption control program, the execution level control program, the scheduling control program and the magnetic drum control program. The control of the execution control program is effected by setting or resetting of the mask register IMF consisting of flip-flop circuits prohibiting interruption in the unit CC.

The call processing program is a group of programs for controlling the connection of a call from occurrence to termination. The call processing program itself consists of three programs, i.e., input program, internal program and output program. The input program is a group of programs for detecting the supervisory signal, the selecting signal, etc., for the subscriber and trunk lines, etc., and for sending a request for a predetermined process to the internal processing program. The internal program is a group of programs for making the selection of respective subscriber lines, trunk lines or speech paths depending on the request from the input processing program and for providing an order for the output processing program. The output program establishes a speech path or disconnection thereof or sends a supervisory signal selection signal, etc., according to the instructed order from the internal processing program.

The input or output program requires periodical execution as a real time function of the supervisory signal, or the selecting signal or the operating configuration of the switch controller SC, and the relay controller RC. Accordingly, these programs are given a higher class execution level by interrupting relatively less stringent real time processes. For example, the internal program can be interrupted at 10 millisecond intervals, by rotating the magnetic drum unit MDU. The input program and output program are hence each termed a clock level program, whereas the internal program, which may be interrupted by the clock level program is termed a base level program.

The fault recovery program is a group of programs generally initiated at the occurrence of a fault detected by circuitry. The fault recovery program controls identification of the faulty device, the re-establishment of the operation of the system, and the re-starting of the call processing program. There are various kinds of fault recovery programs for each cause of interruption and this program is given a higher order execution level than the clock level programs.

5–2 Accommodation of Program and Data in the Memory TM

In the illustrated embodiment of the system, where a small number of subscribers are to be accommodated, the temporary memory TM can be built up from a single memory device $TM_0$ and one standby device ST-TM. As the number of subscribers increase the devices $TM_1$, $TM_2$, $TM_3$ will be successively added. The allocation of program and data to the memory TM is so arranged that if two devices ($TM_0$, $TM_1$) are used, the execution control program, fault recovery program and the related programs are allocated to the device $TM_0$. In the standby device ST-TM are allocated programs which have stringent real time and periodic execution requirements. The magnetic drum unit MDU is a slow speed memory of periodic nature and hence programs are allocated to the unit MDU which may be conveniently transferred from the unit MDU to the device ST-TM in case the memory device $TM_0$ fails, i.e., in a fallback mode. Programs which can be executed without decreasing the process capacity can be conveniently allotted to the device ST-TM.

In the device $TM_0$, there is provided an overlay area for transferring the base level program accommodated in the unit MDU and an overlay area for receiving a clock level program accommodated in the unit MDU in case one device of the memory TM is faulty. When the devices $TM_1$, $TM_2$, $TM_3$ are added, the data accommodated in the device $TM_0$ may be increased as the number of subscribers increases and the data accommodated in the unit MDU can be decreased accordingly.

5–3 Program Processing Mode

As mentioned before, in the present system the mode of program processing differs if a faulty device should be present in the temporary memory TM. When the memory TM is operating normally the program processing mode is normal and when a fault develops in the memory TM the processing is termed the fallback mode. These processing modes will now be described in more detail.

*a.* Normal Mode

Figure 12:
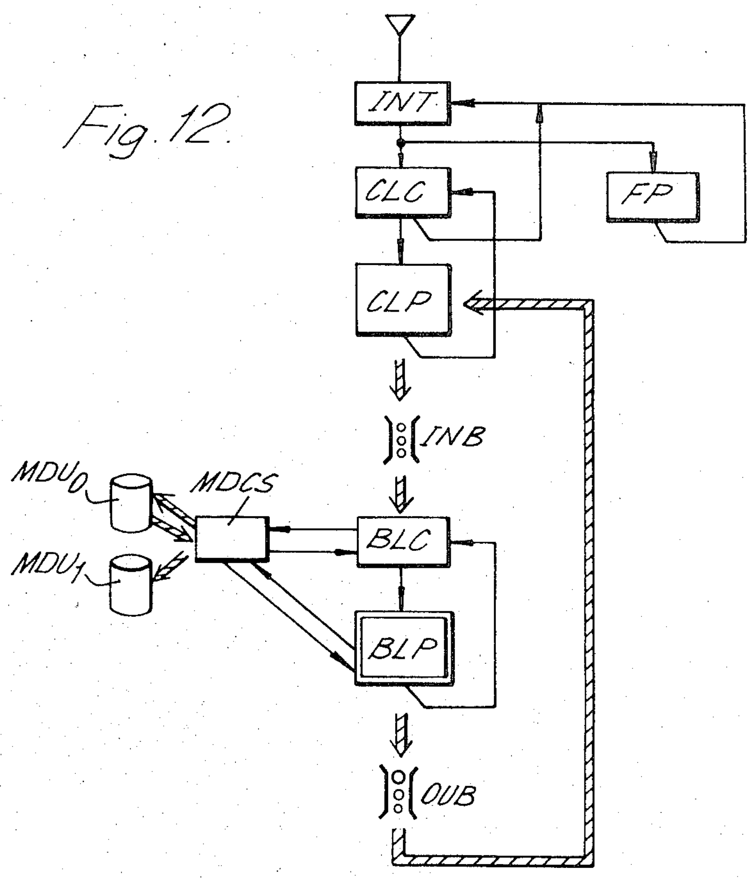
FIG. 12 is a schematic diagram depicting the program process of the system in the normal mode of operation.
Figure 13:
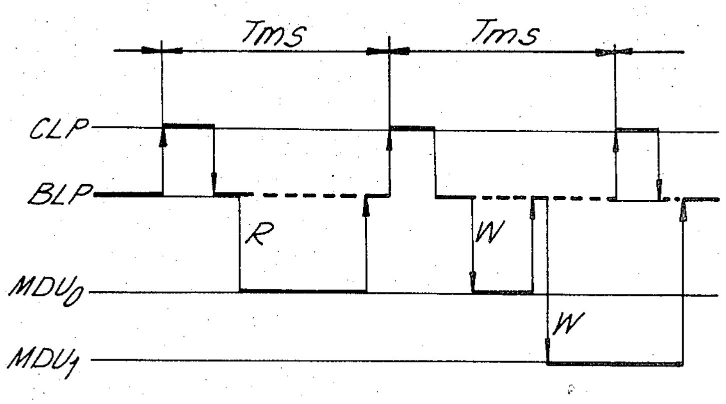
FIG. 13 is a waveform diagram showing the program process in the normal mode of operation.

FIG. 12 is a schematic diagram depicting the normal mode of program processing. The symbols INT, CLC, BLC, MDCS denote the execution control programs, more particularly INT is an interruption program, CLC is a clock level control program, BLC is a base level control program and MDCS is a magnetic drum control program. Also in FIG. 12, CLP is a clock level program, BLP is a base level program, FP is a fault recovery program and INB, OUB are input and output buffer memory devices respectively. Thin lines between the blocks show the flow paths of program control and the thick double lines show the flow paths of data. $MDU_0$, $MDU_1$ are the duplicated magnetic drum units. FIG. 13 depicts the sequence of operations in the normal mode of operation with time as the abscissa. In FIG. 13 the thick line on axis CLP denoting the clock level programs, represents the execution of this clock level program and thick line on axis BLP, denoting the base level program, represents the execution of the base level program. The thick lines on axes $MDU_0$, $MDU_1$ represent the operation of the magnetic drum unit MDU, i.e., from the time when the device MDCH is initiated by the central control unit CC to the time of completion of the transfer of program and data between the memory TM and the unit MDU or vice versa. R and W denote the readout from the unit MDU and the write-in to the unit MDU respectively and T represents the clock interruption period (T = 10 ms).

As described hereinbefore in connection with FIG. 5 if there is an interruption a corresponding bit is set in the interruption source register ISF, and if the corresponding bit is not set in the mask register IMF, which prohibits the interruption, the program INT shown in FIG. 12 is initiated under the control of the system controller SCTL. The interruption program INT reads the interruption source register ISF and decides the execution level to which the interruption source belongs. If the interruption has occurred during the execution of the base level program BLP, the clock level control program CLC is started under control of the interruption program INT and the program CLC renews the clock memory provided in temporary memory TM. This clock memory is used exclusively by the group of clock level programs CLP accommodated in the device ST-TM. A group of programs to be executed are started successively by the clock memory and at the completion of all the programs control is returned to the interruption program INT. The program INT recovers the interrupted information and returns control to the program which was interrupted. During operation of the program INT the clock level program CLP is instructed to scan the trunk TRK, the call detector CD and various other devices by means of the scanner SCN to check the existence of a call requesting internal processing. If a call requesting internal processing is detected, one of the memories of the device INB is selected and the information concerning the request is written into the memory of the device INB. This memory is then registered into a queue waiting for internal processing. A memory in the output buffer memory device OUB prepared in the base level program BLP and registered in the queue for waiting an output process is selected to send out orders to the switch controller SC, the relay controller RC and the signal distributor SD in a predetermined sequence. The base level control program BLC picks up the memory of the device INB requesting the internal processing from the queue and refers to a conversion table to locate the stored address of the program BLP in the unit MDU and starts the magnetic drum control program MDCS.

The magnetic drum control program MDCS provides commands for the magnetic drum channel device MDCH based on the address in the unit MDU and determines the starting address for the transfer to the overlay area of the memory TM given by the base level control program BLC. In order to prevent interruption of the transfer of information from the drum unit MDU a corresponding bit is set in mask register IMF to prohibit such interruption. Thereafter, a corresponding bit is set in the interruption source register ISF and the program awaits the completion of the transfer.

In FIG. 13 the dotted line on axis BLP denoting the base level program indicates the supervision of the completion of transfer of information from the magnetic drum unit MDU by the magnetic drum controlling program MDCS. The program MDCS returns the control to the base level control program BLC as soon as the transfer is completed. The base level control program BLC then starts the base level program BLP which had been transferred to the overlay area of the memory TM. The program BLP analyses the supervisory and selecting signals, etc., based on the information in the input buffer device INB as mentioned above, and selects the trunk circuit, switches and the like. If it is necessary to control the peripheral system the program BLP selects an idle memory in the output buffer device OUB and sets a control order in this memory which is registered in a queue awaiting output processing.

If it is required to read data from or write data into the unit MDU at this stage the magnetic drum control program MDCS is started. The program MDCS performs a sequential control process in the manner described previously for transferring data between the unit MDU and the memory TM, and returns control to the base level program BLP upon completion of the transfer.

The internal processing programs concerning the memory of the input buffer device INB are accommodated in the unit MDU as a plurality of overlay areas since the memory capacity requirement varies depending upon the processing needed and overlay areas should be made as small as possible for economy. Accordingly, if the data transferred under control of the base level control program BLC exceeds the capacity of a single overlay area, the program sends a request that the program MDCS transfers data into another overlay area. The program MDCS provides a command based on the address of next overlay area in the unit MDU and associated information given by the base level program BLP and controls the transfer to the new overlay area in the manner described above. After the transfer is completed the program MDCS starts the base level program BLP.

The reading out of program and data from the magnetic drum unit MDU is effected from either one of the duplicated units $MDU_0$ or $MDU_1$. More particularly, if there is no fault in either of duplicated magnetic drum units MDU, in the magnetic drum channel devices MDCH or in the central control units $CC_0$, $CC_1$ reading out is effected from either of the units $MDU_0$ or $MDU_1$ as determined by the program. If there is a fault then reading out is effected from the normal magnetic drum unit MDU. The writing of data into the magnetic drum unit MDU is effected for both the units $MDU_0$ and $MDU_1$ so that each unit has identical information recorded therein so that this information is not lost even if one of the recording systems is faulty.

Each drum unit $MDU_0$, $MDU_1$ and its associated channel device $MDCH_0$, $MDH_1$ is connected to its associated central control unit $CC_0$, $CC_1$ so that only the associated central control unit CC can have access to the unit $MDU_0$, $MDU_1$. During control of the magnetic drum unit MDU a number allocated to the magnetic drum channel device MDCH is designated by the program, i.e., by an order, and if this order is executed, the number of the device and the content of the designator X (FIG. 8) in the peripheral controller PCTL are matched. The device MDCH is then started by the control unit $CC_0$, $CC_1$ associated therewith and information is transferred between the memory TM and the drum MDU. In this case, a signal indicating completion of the transfer from the device MDCH is fed to both of the control units $CC_0$, $CC_1$ so that the operation of these units can be synchronized.

Upon completion of an internal program concerning a particular memory of the input buffer memory device INB control is returned to the program BLC. The base level control program BLC now picks up the next succeeding memory of the device INB from the queue awaiting internal processing and effects the same process as mentioned above. If there is no further memory of the device INB in the queue, the base level control program BLC awaits the registration of the device INB from the clock level program CLP.

As mentioned above, if there is an increase in the number of subscribers the capacity of the memory TM may be increased to accommodate a part of the internal program originally accommodated in the drum unit MDU. In this case, the conversion table indicating the address of overlay program in the drum MDU and provided in a particular device of the memory TM may also indicate that the program is accommodated in the memory TM, and the starting address of such a program. The base level control program BLC identifies that the program is accommodated in the memory TM by referring to the conversion table, and the program in question can be started directly.

b. Fallback Mode

The fallback mode of operation is executed by transferring the clock level program CLP from the unit MDU to an overlay area of the memory TM when one device of the memory TM is faulty. As briefly mentioned above, this process is effected by a accommodating the clock level program CLP, previously accommodated in the standby device ST-TM in the normal mode of operation, into the unit MDU. Thereby the clock level program CLP can be executed periodically since the unit MDU has a periodic operational characteristic.

The minimum execution period $T$ of the clock level program CLP has the following relationship in respect of the rotation period $\tau$ of the unit MDU.

$$T = n\tau$$

wherein $n$ is an integral number or a reciprocal thereof.

In the present embodiment, $T = 10$ ms, $\tau = 20$ ms and therefore; $n = ½$.

The clock level program CLP is composed of a number of individual programs and the execution period of each of these programs is assumed to correspond to an integral multiple of $T$. Assuming the least common multiple of each execution period is $mT$ (in the present embodiment $m = 10$ and $nm = 5$) five tracks of the unit MDU may be used to accommodate the entire clock level program CLP. In this case, in $n$ tracks ($n = ½$), the programs for one clock period are accommodated. Allocation in the $n$ tracks is so arranged that each program is distributed in each clock period and hence;

$$ts + te \leq T$$

wherein $ts$ is maximum transfer time of the programs to be transferred in the clock period, and $te$ is maximum execution time after the transfer ($te =$ 4 ms).

Figure 16:
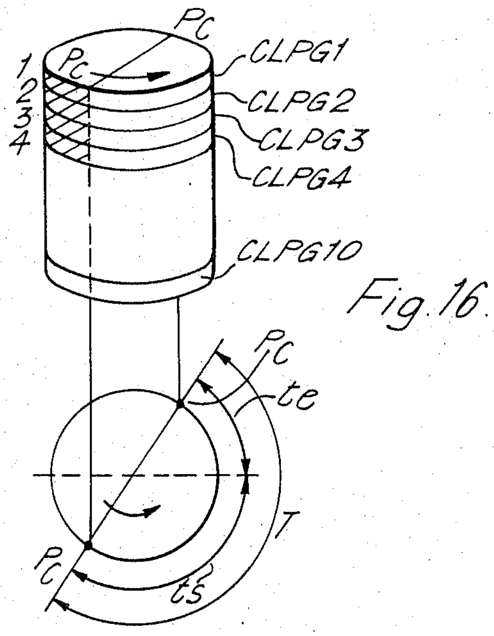
FIG. 16 is an illustration of the magnetic drum showing the accommodation of programs therein.

FIG. 16 depicts the accommodation of the individual programs of the clock level program CLP in one of the magnetic drum units $MDU_0$, $MDU_1$. As shown in FIG. 16, individual program groups $CLPG_1$, $CLPG_2$ . . . $CLPG_{10}$, each of which is to be executed during each clock period, are accommodated in a peripheral zone having a rotational time of $ts$ leaving an idle time $te$ from the clock interruption $P_c$ to the start of each program. The execution of the program $CLPG_i$, for example, transferred into the overlay area of the temporary memory TM from the unit MDU is effected at a maximum time $te$ after the occurrence of clock interruption $P_c$. Immediately after the completion of execution of the program $CLBG_i$, for one clock period, a transfer of the next program $CLPG_{i+1}$, which is to be executed in the succeeding clock period to the unit MDU occurs so that when the next clock interruption occurs the program $CLPG_{i+1}$ has already been transferred and allocated to the unit MDU.

Figure 14:
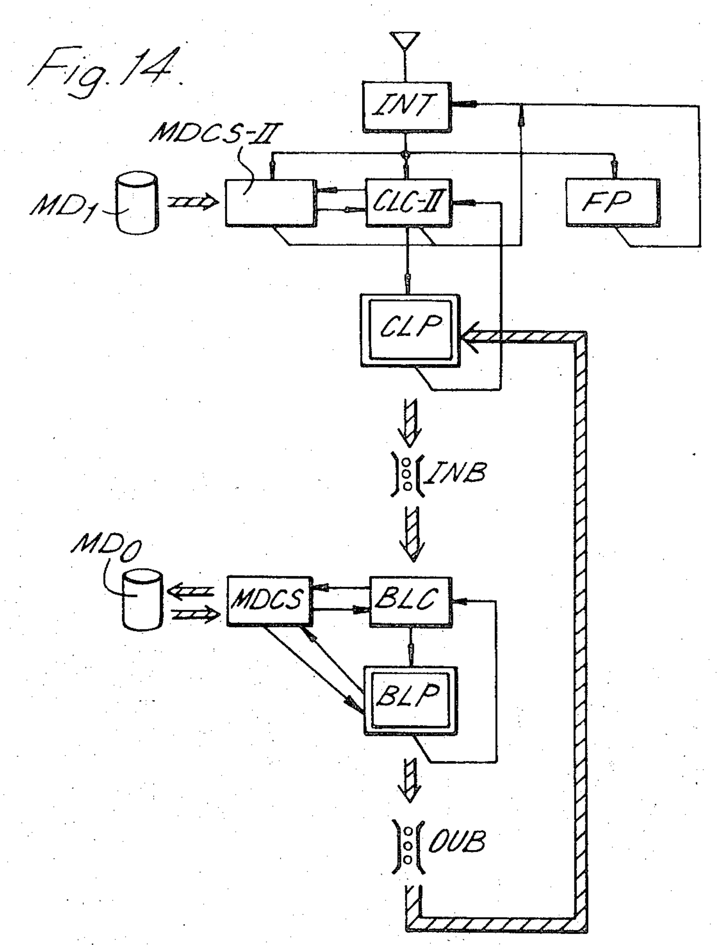
FIG. 14 is a schematic diagram depicting the program process in the fallback mode of operation.

FIG. 14 depicts the fallback mode operation in which CLC-II, MDCS-II are the clock level control program and the magnetic drum controlling program in fallback mode, respectively; these programs have a slightly different function to the respective programs in the normal mode of operation.

The basic difference in the program processing between the normal mode and the fallback mode is limited only to the programs of clock level control program CLC and magnetic drum control program MDCS. However, in the fallback mode of operation, one part of the magnetic drum unit MDU is used exclusively by the program CLP and the writing of data into magnetic drum MDU from the base level program BLP is limited only to the part of unit reserved for the program BLP.

The detail of these programs CLC-II and MDCS-II will be explained hereinafter and since the other programs operate in the same manner as the normal mode no further explanation of these programs will be given.

Figure 15:
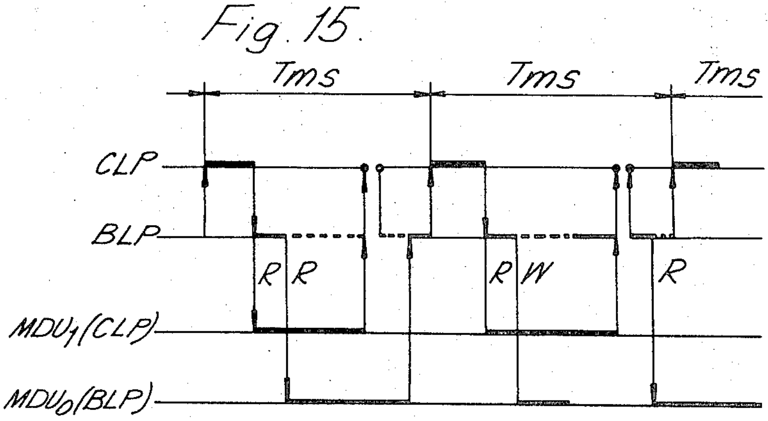
FIG. 15 is a waveform diagram showing the operation of the program process in the fallback mode of operation.

FIG. 15 depicts the sequence of operations in the fallback mode of operation with time as the abscissa. In FIG. 15 the thick dotted line on the axis BLP, denoting the base level program, shows a part of the execution of magnetic drum control program MDCS-II and this portion is different from the normal mode of operation. However, other portions of the operation are same as the normal mode of operation as depicted in FIGS. 13 and 14. In the present embodiment, one of magnetic drum units MDU is used as a standby for the memory TM, the units MDU being divided into groups to allocate the programs CLP and BLP.

The clock level control program CLC-II is started at each clock interruption by the interruption program INT, and executes the individual programs of the program CLP transferred into the overlay areas of the unit MDU by virtue of orders derived immediately after the completion of the preceding program of the clock level program CLP in the previous clock period. Upon completion of the execution of one of the programs CLP the control program CLC-II orders the transfer of the program group (CLPG) to be executed in the succeeding clock period by the magnetic drum program MDCS-II. The program MDCS for the normal operation serves to supervise the completion of the interruption and masks the transfer of data after sending out the transfer command to the magnetic drum channel device MDCH. The program MDCS-II, in contrast to this, does not provide a mask after sending the transfer command to the device MDCH used for the program CLP, but it immediately returns to the interruption program INT via the control program CLC-II and back to the interrupted program. Accordingly, even during the time of transfer of the clock level program CLP, the execution of the base level program BLP is possible. Therefore, the processing load for the unit CC does not differ materially from that of the normal mode, even at the time of substitution of the device ST-TM for the unit MDU when a fault occurs in the memory TM.

*c.* Fault Recovery Operation

In the present system various fault detection facilities are provided, although not shown in detail, e.g., the aforementioned circuit for matching the data between the units CC, the parity check circuit of the memory TM and an illegal code detecting circuit. Whenever a fault is detected a corresponding bit is set in the interruption source register ISF and fault interruption is given a higher execution level in the program than the clock interruption. The fault interruption interrupts the execution of the call program and execution control program and starts a fault recovery program, depending upon the source of the fault interruption, via the interruption program INT. The fault recovery program functions to identify the faulty device, removes the faulty device from the system and re-establishes the call process.

If the faulty device is recognized to be in the unit MDU, the device MDCH or the unit CC, the system controller SCTL in the unit CC is ordered to stop the synchronized operation of the units $CC_0$, $CC_1$ and the passive arrangement is disconnected from the active arrangement, so that the system is now operated with only the active arrangement. If the faulty device is included in the active arrangement, interchange between the active and passive arrangements is effected by an order and the disconnection is effected afterwards. Once the system is operating with only the active arrangement the fault recovery program returns the control to the program INT and the program INT recovers the interrupted information in the unit CC and restarts the call process.

In case the faulty device is recognized in the memory TM, the emergency device EMA is activated since it is now necessary to rely on the fallback mode mentioned above and it may be impossible to execute the fault recovery program. The emergency device EMA is started not only by a fault in the memory TM but when there is an overrun of the program, an overflow of the fault recognition timer in the unit CC or an interruption to the voltage supply source.

The device EMA functions to link various combinations of the memory TM and the control arrangement (CC, MDCH and MDU) to find a usable combination. The device EMA initially transfers the emergency program from the magnetic drum unit MDU to the memory TM and starts this program. This program checks to establish a workable combination of devices and if any part of the memory TM or the units CC, MDU or the device MDCH are functioning normally they are interconnected to provide an emergency arrangement operable in the normal mode or in the fallback mode.

Until the establishment of an arrangement operable in the normal mode or in the fallback mode, the emergency device EMA successively selects emergency states as ordered by the emergency program and each of these states is composed of a particular combination of the devices $TM_0$/ST-TM, $CC_0$, $MDCH_0$, $MDU_0/CC_0$, $MDCH_1$, $MDU_1$.

If the system can be made to operate in the normal mode by the above emergency process, the synchronized operation of the control units CC is re-effected. If there is a faulty device in one set of devices CC, MDCH and MDU, the set of normal devices is made the active arrangement and the other arrangement is cut off and the normal mode program is transferred to the memory TM from the unit MDU.

If the system can only be made to operate in the fallback mode, in other words, if one of the devices of the temporary memory TM is faulty, the fallback program is transferred to the memory TM. The logical allotted number of the faulty device is set in the spare memory register SNR (FIG. 7).

After setting each program in the memory TM, the call process is re-commenced utilizing the data concerning the call process stored in the unit MDU, since the data concerning the call process stored in the memory TM would have been destroyed by the execution of the emergency program. The data concerning a call is written in the unit MDU at the time that a called party answers or at beginning of the resulting conversation. Therefore, at the re-commencement of the call process, a call which was previously at the conversation stage at the time of occurrence of the fault is re-established and a call which had not yet reached the conversation stage is treated by supplying a busy tone to the calling party.

The fault recovery process of the peripheral control equipment may be executed during the clock interruption level or base level without interrupting the call process.

The peripheral control equipment, e.g., the devices SRD, $SC_0$, $SC_1$, RChd 0, SCN-DV are so arranged that their faults can be detected by the emergency program. If the register SRD is faulty, the unit CC connected to the normal register SRD is arranged to become the active arrangement and, if necessary, the previously active and passive arrangements are switched over. If no spare device ST-SC is provided in the switch controllers $SC_0$ or $SC_1$, the operational mode of the switch controller SC is altered so that the line link switch LLS and the trunk link switch TLS may be controlled from one of the controller $SC_0$, $SC_1$. In case a standby device ST-SC is provided the faulty switch controller SC is switched off by means of the switching relays RYD and RYE. If a fault is recognized in the relay controller $RC_0$ or scanner driver $SCNDV_0$, the re-establishment of the system is achieved by switching the relays RYA and RYF so that the controller $RC_1$ or the driver $SCNDV_1$ may be used in the system and vice versa.

6. Magnetic Drum Units

The access time (for instance, 10 milliseconds) for the transfer of program and data from a single magnetic drum unit MDU may occupy a considerable part of the operating time of the system and in some instances this cannot be tolerated since this tends to decrease the call handling capability of the system. Therefore, it is desirable to select whichever drum unit MDU provides the fastest access time as will now be described.

Figure 18:
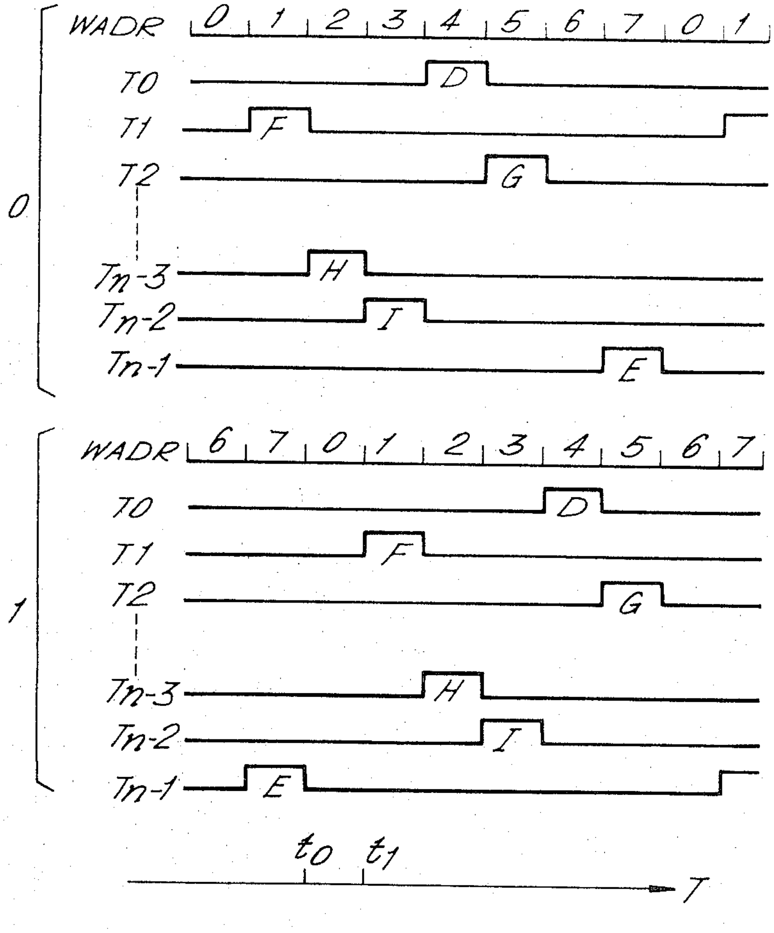
FIG. 18 depicts electrical waveforms occurring during operation of the magnetic drum units.

FIG. 18 shows the output of data from the duplicated magnetic drum units $MDU_0$, $MDU_1$. Each of the drums $MDU_0$, $MDU_1$ has *n* tracks with 8 words per track and rotates in a period TD. Corresponding addresses in the both units $MDU_0$, $MDU_1$ accommodate identical data. In FIG. 18, the one abscissa *T* represents time, and another abscissa WADR indicates the address of data of each unit. The data in each track is indicated as D, F, G, . . . H, I, E. Each address circulates through successive stages denoted 0 to 7 and the address $T_0$-$T_{n-1}$ represents information on n tracks of the respective magnetic drum units $MDU_0$, $MDU_1$.

Assume it is desired to make access to data D having a track address 0 and intra track address 4 at time $t_0$. As shown in figure, it is much quicker to derive the data from the unit $MDU_0$ since the access time will be much shortened. The average access time may be calculated as briefly explained below. In case both the magnetic drum units $MDU_0$, $MDU_1$ have a randomly varying phase relationship the average access time is one-third TD and in case the data phases of the units $MDU_0$, $MDU_1$ deviate by one-half TD the average access time will be one-fourth TD. In any event a great saving of access time is possible as compared to the case where access is made to a single unit in which the average access time is one-half TD.

Figure 8:
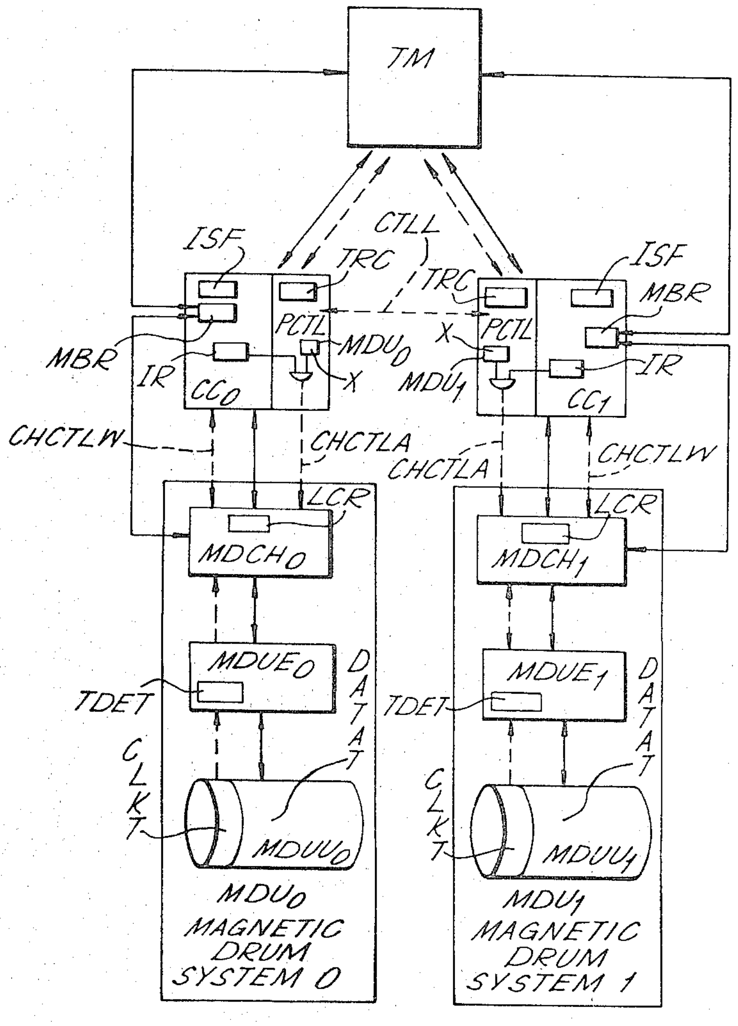
FIG. 8 is a block diagram depicting the magnetic drum configurations of the system.

As shown in FIG. 8 the location of the reading out heads for the magnetic drum units $MDU_0$, $MDU_1$ enable the following relationship to be determined:

The access time when using the unit $MDU_0$ = head location of the unit $MDU_0$ on the track at the moment − position of top word of the content of the data to be read out from the track; and likewise The access time when using the unit $MDU_1$ = head location of the unit $MDU_1$ on the track at the moment − position of top word of the content of the data to be read out from the track.

From this data it can be decided which unit will provide the earlier access and the index of the head on the present track can be readout and thereafter the process is continued by the program.

Figure 17:
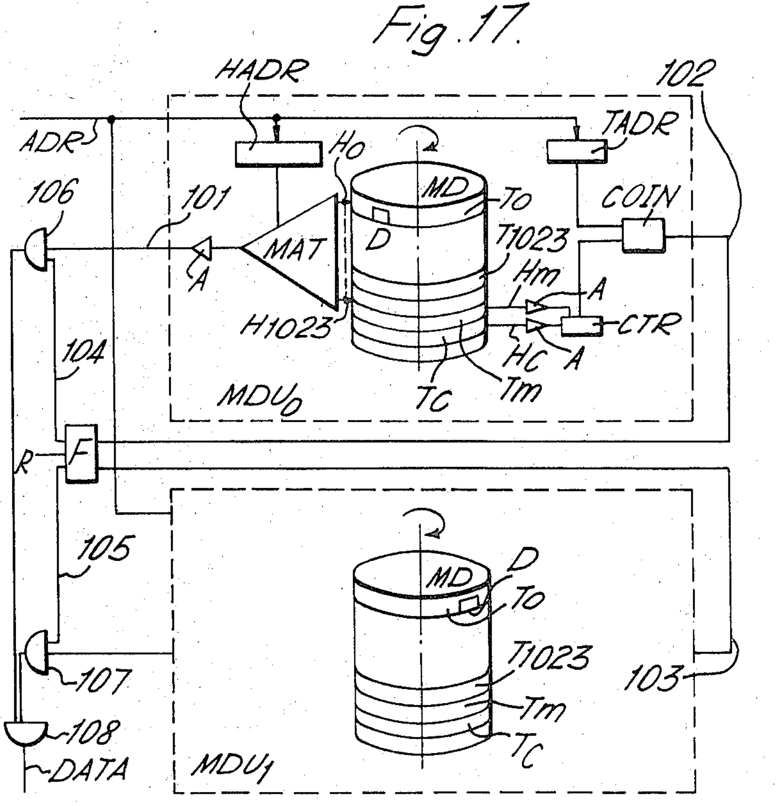
FIG. 17 is an illustration showing the preferred magnetic drum arrangements.

FIG. 17 is a schematic illustration of the preferred magnetic drum arrangement in which the blocks $MDU_0$ and $MDU_1$ shown in broken lines denote the magnetic drum units referred to previously. As both units $MDU_0$ and $MDU_1$ are of identical construction only the unit $MDU_0$ is shown in detail and described hereinafter.

Figure 19:
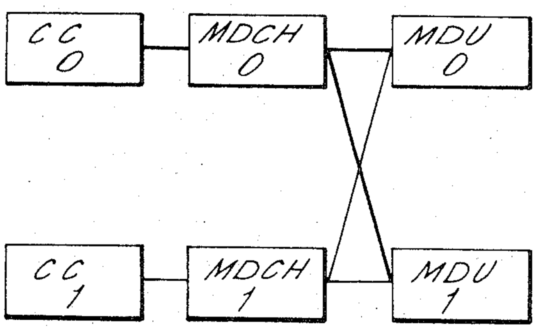
FIG. 19 is a block diagram showing part of the system including the magnetic drum units.

In general, the magnetic drum channel devices MDCH and the magnetic drum units MDU are interconnected as shown in FIG. 19 so that the devices MDCH can provide a readout order to transfer data from the unit MDU which provides the earlier access time and an instruction to write-in a designated unit $MDU_0$, $MDU_1$.

The unit $MDU_0$ has a magnetic drum MD with tracks $T_0$–$T_{1023}$, in which 2,048 words each consisting of 16 bits are memorized per track. The track $T_m$ produces one characteristic pulse per rotation of the drum MD and a track $T_c$ accommodates clock pulses to indicate the memory position of the information bits. $H_0$–$H_{1023}$, $H_m$, $H_c$ are magnetic heads each corresponding to the tracks $T_0$–$T_{1023}$, $T_m$, $T_c$. The heads $H_0$–$H_{1023}$ are connected to a matrix MAT used to select one head from the group of heads. A reading signal of the selected head is demodulated in a demodulator device A connected to the matrix MAT and the result readout in the form of series of digital pulses present on lead 101.

The readout signals from the heads $H_c$ and $H_m$ are also converted to series digital signals via further respective demodulator devices A. The output from the head $H_c$ is used to drive a 15 bit binary counting circuit CTR. The output from the head $H_m$ is used to reset the counter circuit CTR so that the circuit CTR is returned to "zero" once per rotation of the drum MD. As explained before, 2,048 words per track and 16 bits per word are used. Therefore, by referring to the upper 11 bits of the counter CTR it is possible to obtain formation as to the word position in a track and by means of lower four bits information concerning the bit position in the word read out can be recognized.

The block HADR is a 10 bit track address register. The register HADR receives from the lead ADR and subsequently stores the upper 10 bits in the 21 bit word designating information, including the orders for the matrix MAT, for the selection of necessary head. The block TADR is an intra track address register of 11 bits which stores the lower 11 bits from the above mentioned 21 bit word. The block COIN is a coincidence detecting circuit which compares the content of the address register TADR and the upper 11 bits of the circuit CTR. When the circuit COIN detects coincidence it produces an output signal on a lead 102 to identify the word to which readout instruction is designated.

The output lead 102 and a corresponding output lead 103 from the unit $MDU_1$ are connected to the inputs of a flip-flop circuit F which operates as follows:

1. In case a pulse on the lead 102 occurs simultaneously or earlier than the pulse on the lead 103 the circuit F produces a signal "1" on an output lead 104.

2. In case a pulse on the lead 103 occurs earlier than that of lead 102, the circuit F produces a signal 1 on an output lead 105.

3. By applying a pulse to a lead R both the leads 104 and 105 can be set to 0.

AND gates 106 and 107 can be triggered by the signals of the leads 104, 105 to allow a readout signal to pass from the magnetic drum unit $MDU_0$ or $MDU_1$. An OR gate 108 routes the output from both units $MDU_0$, $MDU_1$ to a common output lead DATA.

The operation of the magnetic drum units $MDU_0$, $MDU_1$ will now be described. Assume that a readout instruction is given to a word having a track address 0 and intra-track address D. In this case, the track address register HADR is given the data address 0 via the address lead ADR so that the matrix MAT selects the magnetic head $H_0$, and the data address D is set in the address register TADR. If the data D exists on a track $T_0$, as shown in FIG. 18, the data contained in the unit $MDU_0$ can be read out earlier than that in the unit $MDU_1$ and therefore, the output lead 102 produces an output pulse earlier than the output lead 103. Accordingly, the flip-flop circuit F produces a 1 signal on the lead 104 and the data at the address D is fed to output lead DATA through the AND gate 106 and the OR gate 108. After reading out the necessary word the flip-flop circuit F is restored to its rest state by a pulse on the lead R and the readout operation is terminated.

By using this principle of allowing the fastest access time to prevail the system efficiency can be maximal.

Without the selection arrangement shown in FIG. 17 the average access time is 10 ms and with the selection arrangement shown in FIG. 17 the average access time is 6.7 ms.

7. Supplementary Remarks

In the foregoing, the invention has been described with respect to a telephone exchange system. It is to be understood that the invention has various other applications such as data communication, video communication, and television-telephone exchange systems. The speech path can be modified from the 2-wire type to the 4-wire type or a mixed speech path arrangement constructed from both the 2 and 4-wire types.

The main advantages of the system will now be summarized.

A. Normal Operation

A–1. Program or data is transferred from magnetic drum unit MDU to the temporary memory TM and executed therefrom. Therefore, the number of devices in the temporary memory TM can be decreased with attendant economy.

A–2. The interface between the peripheral equipment and the central control system carries binary coded addresses and intra equipment addresses since the distribution of orders and responses from the peripheral equipment is centralized. Accordingly, the design can be made relatively simple.

A–3. By utilizing the principlé of selecting the magnetic drum providing the fastest access time significant increases in data handling capabilities can be achieved.

A–4. Greater reliability is achieved by synchronizing and matching the operation of the duplicated central control units.

B. In Case of Faults

B–1. If either of the magnetic drum units MDU or the magnetic drum channel device MDCH in one of the duplicated arrangements develops a fault, then the writing and reading may be effected from the other arrangement.

B–2. If either of the duplicated central control units CC or signal receiver and distributor units SRD develop a fault then these duplicated arrangements may be separated and the desired process may be executed by the normal arrangement.

B–3. If the temporary memory TM develops a fault and if the standby device ST-TM is not used normally this device may be substituted for the faulty device. If, however, spare standby device ST-TM is used normally then the fallback mode of operation may be adopted in which the magnetic drum unit MDU may be substituted for the faulty device in the memory TM. Therefore, the memory system may be operated even when there is a fault.

C. Call Detector

By utilizing the call detector CD in the present system, the capacity required for the real time input processing program may be decreased and therefore the total number of the temporary memory devices ($TM_0$–$TM_3$) may be decreased. Also the amount of input program information to be transferred from the magnetic drum unit MDU can also be decreased. Consequently the call handling capacity in the fallback mode of operation can be minimized.

D. By utilizing the speech path controlling equipment SPC the load of the central control unit CC may be decreased. The transfer of program and data from the magnetic drum unit MDU to the memory TM can thus be effected more readily enabling the call handling capacity of the system to be maximized. The central control unit and the switching equipment can easily be separated thus making the design of the system more simple.

Although the invention has been explained by referring to one practical embodiment, many modifications and alterations may be possible without departing from the spirit and scope of the invention.

We claim:

1. A stored program controlled electronic communication switching system comprising:

a. a plurality of duplicated slow speed memory means, each of which operates independently and stores infrequently used programs and data used to operate said switching system, each of said slow speed memory means storing the same programs and data, b. peripheral equipment including input-output processing means coupled to said slow speed memory means for transferring programs and data to and from said slow speed memory means, c. a plurality of non-duplicated high speed temporary memory means for accommodating frequently used programs and data for operating said switching system, d. a standby high speed temporary memory means for replacing a defective one of said plurality of temporary memory means, e. duplicated central control units adapted to operate in synchronism, f. means for causing one of said control units to operate in an active mode and the other of said control units to operate in a passive mode, said control unit operating in an active mode controlling said high speed temporary memory means, each of said control units being capable of independently controlling said input-output means to execute a program, said active mode control unit supplying said non-duplicated high speed temporary memory means with address signals and write data therein, both central control units simultaneously receiving response signals from said non-duplicated high speed temporary memory means, g. conversion register means, interconnecting the non-duplicated high speed temporary memory means and the control units for effecting conversion between logical addresses used in the central control units and inter-equipment and intra-equipment addresses, h. means for returning the result of execution of a program by said input-output means to the central control units, i. means for transferring information from the duplicated slow speed memory means to the high speed temporary memory means, and j. fallback mode operation means responsive to a defect in any of said plurality of non-duplicated high speed temporary memory means, for transferring data from the plurality of duplicated slow speed memory means to the standby temporary memory means and replacing the defective high speed temporary memory means by the standby temporary memory means supplied with the data from the duplicated slow speed memory means.

2. A stored program controlled electronic communications switching system comprising, a plurality of slow speed memories storing relatively infrequently used programs and data, a plurality of high speed temporary memories storing frequently used programs and data, each of said temporary memories including an overlay area for accommodating information in the form of program and data from said slow speed memories, means for transferring selected information from said slow speed memories to the overlay areas of said temporary memories, duplicated central control units operating simultaneously and in synchronism whereby both central units execute an instruction simultaneously, means for matching the data in each central control unit each time an instruction is executed, call detector means for identifying a calling subscriber, said call detector means comprising a diode matrix connected to subscriber lines, detecting relay circuits responsive to said diode matrix, priority sequence designator circuit means responsive to said detecting relay circuits for preventing further operation of the detecting relay circuits after an initial calling subscriber has been identified, a supervisory circuit means for sending a service request over a single lead, and a code converter means responsive to said detecting relay circuits for converting the subscriber's allocated number to a system recognizable digital code.

3. A system according to claim 2 further comprising speech path means responsive to the programs and data stored in said slow speed and high speed memories and comprising, duplicated signal receiving and distributing means, each coupled to a different control unit, for distributing information used to control speech path equipment, said speech path equipment including, a line link switch controller, a trunk link switch controller and a spare link switch controller, said switch controllers operating to control speech path switches to define a requested speech path and a relay controller for controlling the speech path relays in accordance with the signal from said signal decoder and distributor.

4. A system according to claim 3 further including typewriter controller means for enabling manual communication with said system for maintenance purposes.

* * * * *